(12) United States Patent
Meinke

(10) Patent No.: US 12,463,514 B2
(45) Date of Patent: Nov. 4, 2025

(54) SYSTEMS AND METHODS COMBINING DISCRETE FLUX-DIRECTED MAGNET ASSEMBLIES THAT INTEGRATE MAGNETIC GEAR BOXES WITH SINGLE OR DUAL ROTOR MACHINES

(71) Applicant: Rainer B. Meinke, Concord, MA (US)

(72) Inventor: Rainer B. Meinke, Concord, MA (US)

(73) Assignee: Rainer B. Meinke, Concord, MA (US)

( * ) Notice: Subject to any disclaimer, the term of this patent is extended or adjusted under 35 U.S.C. 154(b) by 0 days.

(21) Appl. No.: 18/476,295

(22) Filed: Sep. 27, 2023

(65) Prior Publication Data

US 2024/0120818 A1    Apr. 11, 2024

Related U.S. Application Data

(60) Provisional application No. 63/411,059, filed on Sep. 28, 2022.

(51) Int. Cl.
| | |
|---|---|
| *H02K 16/02* | (2006.01) |
| *H02K 1/276* | (2022.01) |
| *H02K 1/279* | (2022.01) |
| *H02K 21/02* | (2006.01) |

(52) U.S. Cl.
CPC .......... *H02K 16/02* (2013.01); *H02K 1/2766* (2013.01); *H02K 1/279* (2022.01); *H02K 21/028* (2013.01); *H02K 2201/03* (2013.01)

(58) Field of Classification Search
CPC ...... H02K 16/02; H02K 1/279; H02K 1/2766; H02K 21/028; H02K 2201/03; H02K 1/2783; H02K 49/102
USPC ........................................................ 310/114
See application file for complete search history.

(56) References Cited

U.S. PATENT DOCUMENTS

| | | | | |
|---|---|---|---|---|
| 4,763,053 | A * | 8/1988 | Rabe | H02K 15/0407 318/400.41 |
| 5,495,131 | A * | 2/1996 | Goldie | H02K 41/025 318/135 |
| 5,874,796 | A * | 2/1999 | Petersen | H02K 21/12 310/156.45 |

(Continued)

FOREIGN PATENT DOCUMENTS

WO    WO-2020102354 A1 *    5/2020    ............ H02K 1/17

OTHER PUBLICATIONS

PCT International Search Report for International Application No. PCT/US22/21613.

(Continued)

*Primary Examiner* — Alex W Mok
(74) *Attorney, Agent, or Firm* — Accel IP Law, PLLC; Ferdinand M. Romano

(57) ABSTRACT

A magnetic array for use in a synchronous electrical machine or a magnetic gear box, comprising a plurality of discrete magnetic segments. When individual ones of the segments are spaced away from influence of ferromagnetic material, such as prior to placement in the array, each includes a pole having the same maximum field strength. Each segment is positioned in a sequence along a circumferential array with changes in field orientation by which the field of each segment is spatially rotated relative to the field of a next segment in the sequence. Each segment is positioned in sufficient proximity to the next segment in the sequence to enable the fields to interact with one another and effect flux channeling.

21 Claims, 9 Drawing Sheets

(56) References Cited

U.S. PATENT DOCUMENTS

| | | | | |
|---|---|---|---|---|
| 5,925,958 | A * | 7/1999 | Pirc | H02K 53/00 310/46 |
| 7,042,109 | B2 * | 5/2006 | Gabrys | H02K 7/1838 290/55 |
| 7,375,449 | B2 * | 5/2008 | Butterfield | H02K 3/47 310/268 |
| 8,106,563 | B2 * | 1/2012 | Ritchey | H02K 3/28 310/112 |
| 8,397,369 | B2 * | 3/2013 | Smith | H02K 21/12 29/598 |
| 9,735,631 | B2 * | 8/2017 | Kayano | H02K 1/2766 |
| 10,263,480 | B2 * | 4/2019 | Hunstable | H02K 21/12 |
| 10,892,672 | B2 * | 1/2021 | Meinke | H02K 1/278 |
| 2002/0067091 | A1 * | 6/2002 | Kliman | H02K 1/14 310/156.01 |
| 2008/0042515 | A1 * | 2/2008 | Butterfield | H02K 11/33 310/156.36 |
| 2010/0019599 | A1 * | 1/2010 | Saban | H02K 3/50 310/156.12 |
| 2011/0115326 | A1 | 5/2011 | Clark et al. | |
| 2012/0091832 | A1 * | 4/2012 | Soderberg | H01F 1/08 310/156.01 |
| 2012/0262019 | A1 * | 10/2012 | Smith | H02K 21/24 335/302 |
| 2013/0221789 | A1 * | 8/2013 | Atkinson | H02K 1/276 310/156.67 |
| 2014/0049124 | A1 | 2/2014 | Gandhi et al. | |
| 2015/0229194 | A1 | 8/2015 | Sromin | |
| 2015/0236575 | A1 | 8/2015 | Walsh | |
| 2019/0109526 | A1 | 4/2019 | Meinke et al. | |

OTHER PUBLICATIONS

PCT Written Opinion of the International Searching Authority for International Application No. PCT/US22/21613.

C.K. Chandrana, J.A. Neal, D. Platts, B. Morgan, P. Nath "Automatic alignment of multiple magnets into Halbach cylinders", Applied Modern Physics P-21, Los Alamos National Laboratory, Los Alamos, New Mexico, 2015 published by Elsevier.

Arne Wickenbrock, Huijie Zheng, Georgios Chatzidrosos, Joseph Shaji Rebeirro, Tim Schneemann, Peter Blmler "High homogeneity permanent magnet for diamond magnetometry", Helmholtz-Institut Johannes Gutenberg-Universitat, Mainz, Germany, Aug. 18, 2020.

* cited by examiner

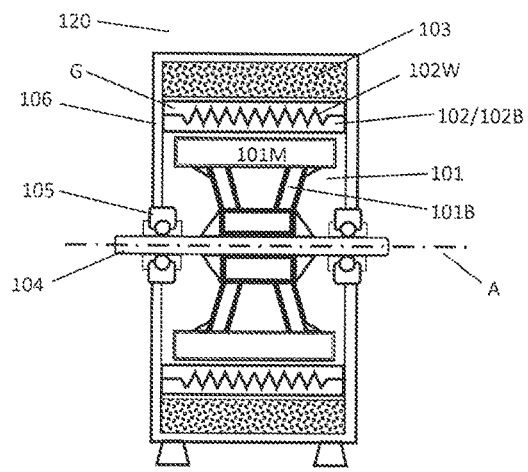
Fig. 1
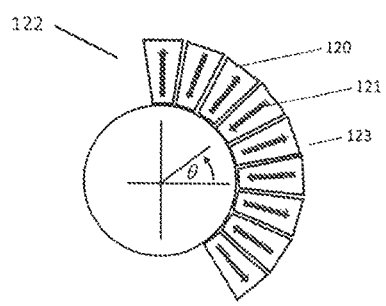 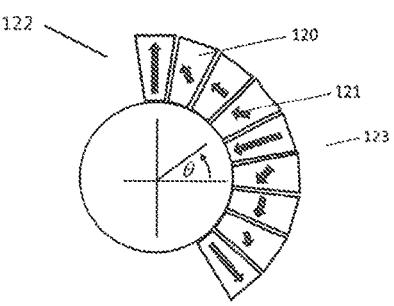
Fig. 2A  Fig. 2B

SYSTEMS AND METHODS COMBINING DISCRETE FLUX-DIRECTED MAGNET ASSEMBLIES THAT INTEGRATE MAGNETIC GEAR BOXES WITH SINGLE OR DUAL ROTOR MACHINES

RELATED APPLICATIONS

This application claims priority to U.S. Provisional Patent Application Ser. No. 63/411,059, titled "Systems and Methods Combining Discrete Flux-Directed Magnet Assemblies that Integrate Magnetic Gear Boxes with Single or Dual Rotor Machines", filed Sep. 28, 2022. This application is related to U.S. Provisional Patent Application Ser. No. 63/165,107, titled "Discrete Flux-Directed Magnet Assemblies", filed Mar. 23, 2021 and PCT Application US2022/021613 "Discrete Flux-Directed Magnet Assemblies and Systems Formed Therewith", filed 23 Mar. 2022, and PCT Application US2022/030594 "Discrete Flux-Directed Magnet Assemblies and Systems Formed Therewith", filed 23 May 2022.

FIELD OF THE INVENTION

The invention relates to improved power and torque densities in systems comprising synchronous electric machines and, more specifically, embodiments of the invention include systems and methods which integrate Discrete Flux-Directed Magnetic (FDM) assemblies to combine functions of magnetic gear boxes with single or dual rotor motors or generators.

BACKGROUND

Increasing the power to mass and torque to mass ratios in electric machines, i.e., power and torque densities, is key to deploying electric power in a wider variety of new applications where mass and size of the machines are critical, such as for aircraft, turboshaft power generation and wind power generation. With existing machine technologies, power densities on the order of 5 kW/kg are achievable but constitute a limiting factor for many new applications. Further design improvements in higher power and torque densities will also benefit existing applications, such as electric vehicles. The potential benefits include higher efficiencies in both energy conversion and transmission, as well as reductions in carbon footprint, thermal generation, and regulated emissions.

In theory, the highest power and torque densities can be achieved with fully superconducting, synchronous machines, for which power densities on the order of 25 kW/kg or higher appear possible. However, AC losses in superconducting stator windings can only be accommodated at low RPMs. Partially superconducting machines with DC rotors could, in principle, generate an airgap flux density of several Tesla, and thereby offer the potential of reaching higher power and torque densities. However, saturation of the required back iron limits the flux density in the airgap to values below 2 Tesla, and the heavy weight of the back iron further limits achievable power and torque densities. The required cryogenics and the complexity of quench detection and protection for a rotating superconducting system complicates wide-spread use of superconducting machine technology unless much higher power levels and torque densities can be reached.

In 1973 John C. Mallinson, a British-American physicist, published a magnetic theory for a new class of magnetization patterns for planar structures in which the magnetization direction is a spatially rotating flux with constant amplitude. Such an ordered array of permanent magnet elements augments the magnetic field on one side of the array while canceling the field to near zero on the other side of the array. See Mallinson, J. C., IEEE Transactions on Magnetics, Vol. MAG-9, No. 4, pp 678-682, December 1973. The spatially rotating pattern of magnetization direction is commonly understood to channel the flux from each magnetic element to an adjoining magnetic element in the array. An application of flux channeling with assemblies of magnetic elements is exemplified in the Halbach Array, invented by Klaus Halbach in 1980 for charged particle beam optics in accelerators and corresponding beam lines. See Halbach, Klaus, Nuclear Instruments and Methods, 169 (1): 1-10 "Design of Permanent Multipole Magnets with Oriented Rare Earth Cobalt Material" (1980).

For particle accelerator applications it is necessary to bend, focus and apply chromatic corrections on charged particle beams. This is done with electromagnetic coils containing a fixed number of precisely arranged pole pairs. A dipole arrangement for bending a charged particle beam consists of a single pole pair, i.e., n=1, having one north pole and one south pole. For focusing a charged particle beam, the coil configuration is a quadrupole arrangement (n=2) containing two pairs of north poles and two pairs of south poles. Chromatic corrections, which focus particles with different momenta to a precise focal point, call for higher-order arrangements of n=3 or more pole pairs. In general, any desired magnetic field in the cross section of an aperture of infinite length can be described or synthesized as a superposition of so-called multipole components, that is, a combination of select multipoles, e.g., dipoles, quadrupoles, sextupoles, etc. The magnetic fields used for charged particle beam optics must be highly accurate, analogous to the stringent requirements for conventional optical lenses. Mathematically, this accuracy requirement is fulfilled when each magnet comprises a single multipole order, e.g., a pure quadrupole (n=2), without any contribution of lower or higher-order terms.

Halbach arrays offer the required high field uniformity needed for charged particle beam optics. In these magnet assemblies, the flux direction at any point is given by the following equations in polar coordinates:

$$B_r = B_{rem} * \cos(p*\theta) \quad \text{(Eqn 1)}$$

and $$B_\theta = B_{rem} * \sin(p*\theta) \quad \text{(Eqn 2)}$$

where $B_{rem}$ is the magnitude of the remanent flux density and p is an integer specifying the number of pole pairs. The subscript "r" denotes the radial component of the field and the subscript "θ" denotes the tangential component of the field. A positive value of p produces a field that is directed in the radially outward direction of the array, and a negative value of p produces a field that is directed in the radially inward direction of the array, i.e., toward the central axis of the cylinder.

Electric machines also require the same multipole configurations as needed for charged particle beam optics, but the field uniformity requirements are less stringent than for charged particle beam optics. For the rotors of synchronous machines, permanent magnet Halbach arrays enable a simple and energy-efficient realization of generating the required multipole configuration and the augmentation of flux density on one side of the arrays yields increased power and torque density. However, the complexity and high cost of manufacturing Halbach arrays, in particular those with high pole numbers, has impeded their widespread use in electric machinery.

To achieve significant improvements in the performance of synchronous machines with respect to power, torque density and efficiency, new design topologies are needed that apply proven concepts with improved manufacturing technologies and optimization methodologies. Specifically, new topologies are needed to more fully realize the advantages of flux channeling in normal and superconducting coil configurations. Embodiments of the invention improve the performance of synchronous machines with flux channeling designs and without difficulties associated with manufacture and assembly of conventional Halbach arrays.

SUMMARY OF THE INVENTION

Exemplary embodiments of the invention facilitate improved power and torque density in synchronous machines but are not limited to these types of electrical machine designs. Generally, the power (P) of a synchronous machine can be described by the following equation:

$$P \propto \pi^2 \omega * L * D^2 * B_R * A_S \qquad \text{Eqn. 3}$$

where L and D, are length and diameter of the machine, $\omega$ is the angular velocity (RPM), $B_R$ the flux density in the air gap, and $A_S$ the armature loading, given by:

$$A_S \propto \frac{I}{\pi * D} \qquad \text{Eqn. 4}$$

with I, the current per phase, and $\pi*D$ the average perimeter length of the stator. Since the power density can simply be increased by increasing the RPM, the torque ($\theta$) is in many cases the more meaningful parameter for a measure of machine performance, given by Eqn. 5.

$$\theta \propto \pi^2 * L * D^2 * B_R * A_S \qquad \text{Eqn. 5}$$

Dividing power or torque by the weight of a given machine embodiment, yields its power or torque density. For applications like aircraft propulsion, power and torque density are the relevant machine parameters since the weight of the propulsion system must be minimized to maximize power and torque densities.

As shown by Eqns. 3 and 5, power is optimized by maximizing the flux density $B_R$ in the air gap. To achieve the highest possible power, the flux density in the air gap must be perpendicular to the current in the stator winding, and the field in the air gap therefore must point in the radial direction. This is typically achieved by using back iron around the stator as a return path for the magnetic flux of the field-generating rotor. Since the back iron constitutes a significant part of the total machine weight, it limits the achievable power density and also limits the achievable flux density in the air gap clue to ferromagnetic saturation.

In synchronous machines, the back iron can be eliminated by using a set of opposing flux-channeled magnetic assemblies, e.g., an inner assembly 302 with outside-directed radial flux and an opposing outer assembly 300 with inside-directed flux, these referred to as Flux Directed Magnetic (FDM) ring assemblies or FDM assemblies. See, for example, FIG. 8a. Due to the flux channeling properties of such magnetic assemblies, no back iron is needed for the optimum flux-direction. Prior art flux-channeled magnet assemblies have been implemented as almost-continuous Halbach-like arrays. While Halbach arrays enable high power densities in electrical machines they require a complex manufacturing process and the resulting high manufacturing costs have impeded their widespread use. The disclosed embodiments include methods which do not present manufacturing issues of the type encountered with conventional Halbach arrays and enable more cost-effective synchronous machines for which unprecedented power and torque density are achievable.

In one series of embodiments, rod-like permanent magnets or coils (e.g., having cylindrical, polygonal or other axially symmetric shapes), referred to as discrete magnetic segments, each have a major axis of symmetry along an elongate length relative to a width in cross section of relatively smaller dimension, which width is measured along a direction transverse to the major axis. The field from each magnetic segment constitutes a dipole field which extends in directions transverse to the major axis. Individual magnetic segments are inserted into matching channels, apertures or grooves of a support structure, e.g., support structure 600 or 602 such as schematically shown for apertures 601. See FIGS. 8a and 9a which are applicable to the machine design shown in FIGS. 7, The relative orientations of the individual magnetic segments are chosen such that the magnetic flux is channeled either toward the inner or outer surface of each magnetic ring assembly, e.g., FDM ring assemblies 300 or 302. The discrete magnetic segments of these assemblies for flux channeling can also be implemented with superconducting coils which enable flux densities across the air gap at the stator winding of multiple Tesla, i.e., levels that are not possible to achieve with permanent magnets or systems relying on back iron.

As shown in FIG. 7a, the outer and inner field-generating Flux-Directed Magnetic (FDM) ring assemblies 110 are securely attached to the shaft 104 for rotation. The multiple stator phase windings 102W to generate rotating magnetic fields are attached to the stator body 102 which is fixed to the machine frame 106. The windings 102W extend into and along the airgap between the two magnet assemblies. To achieve a radial flux direction in the airgap, the two magnet assemblies have the same number of pole pairs. The number of pole pairs can be optimized for a given machine application based on, for example, required RPM of the machine and the voltage of the phase windings.

To optimize flux density in the air gap, the radial distance between the two magnet assemblies must be as small as possible since the fields of the magnetic assemblies falls off with radial distance from their surface. A small airgap requires flat, concentric phase windings which consist of saddle coils with the appropriate number of poles that matches the magnet assemblies. Since the phase windings transmit the whole torque of the machine, they must be attached to the machine housing with appropriate torque transfer capability. In a typical embodiment the saddle coils for each phase are embedded in structural cylinders which are concentric to each other. Since the flux density in the air gap is a function of the radial distance from the axis, the mutual inductances of the concentric phase windings will have slightly different mutual inductance values and therefore must be equalized. Their mutual inductances can be can be adjusted, for example, by varying the length of each phase winding accordingly.

Since the FDM ring assemblies 300 and 302 rotate with high-speed relative to the fixed stator windings, some radial clearance between the two systems is required. To optimize the flux density seen by the stator windings, this clearance should be minimized. Precise, stamped laminations for the support structures 600 of the FDM ring assemblies (see below) will enable the smallest possible radial clearance to achieve highest power and torque densities.

The advantages of FDM ring assemblies can also be applied to other embodiments of synchronous machines with one flux-channeled assembly instead of two opposing FDM ring assemblies as shown in FIG. 7*a*. In this case one assembly can be replaced with an iron yoke to bend the flux in the radial direction through the air gap to optimize the torque. Such an embodiment is shown in FIG. 3. Also, with regard to FIG. 7*a*, the outer magnet assembly 113 is replaced with non-rotatable back iron 103 which is attached to the machine housing. Although, flux density in the air gap, G, is reduced, since the superimposed flux from the outer assembly is missing, the mechanical design of the system is simplified because the outer rotating FDM ring assembly 300 is absent. However, due to changing flux introduced by the rotor and impinging on the back iron, significant magnetization losses at high RPM of the machine will reduce the efficiency of the machine. i.e., the transfer from mechanical to electrical energy in the case of a generator and the opposite transfer for a motor.

By replacing the outer magnet assembly 113 of FIG. 7*a* with back iron that rotates together with the inner magnet assembly 115, magnetization losses can be significantly reduced, and the machine efficiency increased. This configuration is shown in FIG. 4. The remaining power losses are due to unavoidable eddy current losses in the stator windings.

The power and torque density of the machine shown in FIG. 4 can be increased by placing the flux-channeled assembly on the outside and positioning a flux directing iron yoke 112 on the inside, and attached to the machine housing, as shown in FIG. 5. Since the field of a flux channeled array fads off more rapidly for outward directed flux than for inward-directed flux, the configuration shown in FIG. 5 is advantageous with respect to power and torque density in comparison to the design of FIG. 4. The opposing iron 112 in this implementation is attached to the rotor assembly as shown in FIG. 6. This embodiment is similar to the embodiment of FIG. 7*a*, having the two opposing flux-channeled arrays 113, 116, the difference between the two embodiments of FIGS. 6 and FIG. 7*a* being that the inner FDM ring assembly is replaced with the flux directing iron yoke 112 iron which might reduce the overall cost of the machine.

Embodiments using opposing iron in lieu of a second FDM ring assembly are useful in permanent magnet applications. In the case of superconducting coils that generate flux densities of several Tesla, flux saturation in the opposing iron would limit the effect of bending the flux direction in the radial direction, or would require a very large thickness for the opposing iron yoke, this having detrimental effects on the power and torque densities. On the other hand, for machines constructed with opposing flux-channeled assemblies, the flux density in the air gap is only limited by the field-generating devices which, for highest flux densities, must be superconducting coils.

The electric machine embodiments of FIGS. 3 to 7 are useful for machines with modest RPMs. The centrifugal forces, given by $F=m*\omega^2*r$ (where m is the mass of the rotating object, $\omega$ is the rotational velocity and r is the radial distance from the axis), are proportional to the radius. For very high RPM of the machine, it is therefore required the radius of the rotor be reduced to limit the centrifugal forces. An embodiment of a machine for high RPM is shown in FIG. 7*b* in which the inner flux-channeled magnet assembly or an opposing iron yoke is directly attached to the rotating shaft.

Multiple improved electric machine designs are described which enable improved power levels, and improved torque densities and efficiencies for machines comprising permanent magnets, normal conducting electromagnets or superconducting magnetic coils. Using permanent magnets as the field-generating system avoids the complexity of cryogenics and the need for supplying electric energy to a rotating system. On the other hand, integration of flux channeling in superconducting rotors offers the potential for much higher flux densities than heretofore achievable. Embodiments of the invention also provide integration of magnetic gear boxes with electric machines. The following example embodiments are illustrative but not limiting of the scope of the invention.

It is well known in principle that Halbach arrays can provide significant advantages for the field-generating rotor designs of synchronous machines, i.e., over conventional magnet assemblies consisting of alternating north-south pole magnetic structures. That is, with introduction of flux channeling in a circumferential array of magnetic segments, flux density is enhanced on one side of the array where highest flux density is desirable in the gap between a rotor and a stator), while flux density on the opposing, side of the array, where no flux may be needed, can be reduced to near zero. Disclosed embodiments according to the invention produce desirable flux channeling similar to that sought with conventional Halbach arrays. Unlike less than ideal flux channeling which has been practically achievable based on conventional Halbach array principles, embodiments of the invention closely approximate ideal spatially rotating patterns of magnetization directions which are scalable, from very small systems to very large systems. These embodiments can provide high mechanical stability needed for high RPM machine operation without costly manufacturing associated with assembly of conventional Halbach permanent magnet arrays. Moreover, the disclosed designs, systems and methods to effect flux channeling in conventional rotating machines are directly applicable to superconducting machinery.

In one embodiment the efficiency of an electric rotating machine is increased by eliminating magnetization losses in the back iron, as has been required for field shaping in the air gap and reducing the fringe magnetic field. In another embodiment a significant increase in power and torque density is achieved by eliminating the back iron.

Further improvement in applied power and torque density of electric machines is achievable with magnetic gearing that may be integrated with or otherwise coupled to a motor or generator. For magnetic gearing, the disclosed flux channeling concept offers: (i) high mechanical strength at significantly reduced cost in comparison to conventional Halbach arrays, (ii) significantly higher power transfer per unit mass than conventional mechanical or magnetic gearing, (iii) a gearing efficiency which may exceed 99%, and (iv) intrinsic overload protection with minimal or no maintenance.

Further optimization of power and torque density in an electric machine also requires increased current loading in the stator windings and, therefore, highly effective heat dissipation and cooling to assure reliable operations. Highest current loading of the stator winding can be achieved with Bitter-Magnet technology, in which the conductor consists of copper sheets that contain optimized hole patterns for the flow of a coolant with direct contact between the coolant and the heat-generating conductor. See: Soobin An, "A Feasibility Study to Apply the Bitter Magnet to Electric Power Devices", MT-26, September 2019. The Bitter-Magnet technology provides excellent heat dissipation while using cost-effective manufacturing methods.

Exemplary embodiments of the invention provide a magnetic subsystem, referred to as a Flux-Directed Magnetic (FDM) ring assembly, suitable for use in a rotating machine or a magnetic gear box, comprising at least a first array containing at least a first plurality of like discrete magnetic segments each having a segment axis about which it is rotatable and extending along a central axis of the FDM ring assembly with, for example, each segment in the first plurality: (i) having an elongate length, relative to its width, said length extending along a major side thereof in a direction parallel with the central axis; (ii) including a pole with a like characteristic field distribution having at least one maximum field strength direction; (iii) having a surface, with a predefined shape in cross section, from which the maximum field strength direction points outward therefrom, about which surface the segment is axially rotatable prior to fixed placement of the segment in the first array of like magnetic segments circumferentially positioned about the central axis; (iv) fixedly arranged with its major side extending in a direction parallel to directions which the major sides of other segments in the first plurality extend; and (v) positioned to extend in a direction parallel with the central axis to collectively form, in combination with others in the first plurality, the first array of like magnetic segments, which first array is configured as a first ordered sequence having field poles of the magnetic segments each rotated about its segment axis with respect to one another as a function of position in the first ordered sequence, this resulting in shifts in angular orientations of the field poles or magnetization directions of each among the magnetic segments in the first array.

In addition to segments in the first plurality all having a maximum field strength direction, also referred to as the magnetization direction, each such segment may have substantially the same maximum field strength in the magnetization direction. More generally, segments in the first plurality in the magnetic subsystem may be positioned in contact with, or in sufficient proximity to, one or more other segments to additively combine or reduce fields from different segments and thereby impart net field strengths about the first array wherein an augmented magnetic field strength results on one of the inner side or the outer side of the array relative to a reduced magnetic field strength on the other of the inner side or the outer side of the array. The augmented magnetic field strength may result from flux channeling as may, in principle, be effected with a Halbach array.

In one series of embodiments the magnetic segments in the first plurality are in an ordered sequence extending along a cylindrical plane centered about the central axis and the magnetic segments are axially rotatable with respect to other magnetic segments in the first plurality (e.g., relative to a definable angle about the central axis) to sequentially shift orientations of the characteristic maximum field strength direction among segments in the first plurality and thereby effect the augmented magnetic field strength on one side of the array.

The magnetic subsystem may further include a support structure with which: the magnetic segments of the first plurality occupy spatially fixed positions relative to the central axis or relative to one another, and the relative shift in orientation of the characteristic maximum field strength direction among each segment in the first plurality is rotatably fixed about the segment axis thereof after each magnetic segment in the first plurality is rotated about the segment axis thereof to set the orientation of the characteristic maximum field strength direction among the first plurality of segments. To set the orientation of the characteristic maximum field strength direction, the support structure may include a series of channels, apertures or grooves in which the magnetic segments are fixed in place to prevent rotation about the segment axes. The magnetic segments and the channels or grooves may have complementary shapes or mating features which lock the rotational positions of segments in place to rotationally fix the relative shifts in field orientation in place.

In another embodiment the magnetic system includes a support structure having a series of apertures therein and formed along the central axis, with discrete magnetic segments in the first plurality axially rotated and positioned within the apertures to sequentially provide the shifts along the array. The support structure may be formed of a series of stamped laminations, in most cases consisting of non-magnetic material, joined against one another wherein the laminations comprise nonmagnetic material. In one embodiment the FDM ring assembly comprises multiple additional arrays each like the first array and collectively forming a larger sequence of like discrete magnetic segments extending circumferentially about the central axis with sequential and uniform shifts in angular orientations of magnetic segments from each magnetic segment to a next segment in the sequence.

In accord with further embodiments of the invention, the magnetic system further includes a second array structure comprising at least a second plurality of like discrete magnetic segments, and extending along the central axis, with each segment in the second plurality: (i) having an elongate length, relative to its width, extending along a major side thereof in a direction parallel with the central axis; (ii) including a pole with a like characteristic field distribution including a maximum field strength direction and the same maximum field strength; (iii) having a surface, with a predefined shape in cross section, from which the maximum field strength direction points outward therefrom, about which surface the segment is axially rotatable prior to fixed placement of the segment in the second array of like magnetic segments circumferentially positioned about the central axis; (iv) fixedly arranged with its major side extending in a direction parallel to directions which the major sides of other segments in the first plurality extend; and (v) positioned to extend in a direction parallel with the central axis to collectively form, in combination with others in the second plurality, the second array of like magnetic segments, which second array is configured as a second ordered sequence having field poles of the magnetic segments rotated with respect to one another as a function of position in the second sequence, this resulting in shifts in angular orientations of the field poles among magnetic segments in the second sequence. In an example embodiment the second array of magnetic segments is configured to provide a sequence of elements comprising rotationally shifting angular orientations of magnetic field patterns where the angular orientation of field patterns rotates among different magnetic elements in directions orthogonal to the central axis. In other embodiments of the system the spatial rotation of the field patterns configures the flux in a manner which provides an augmented magnetic field strength on one of an inner side or an outer side of the second array relative to providing a reduced magnetic field strength on the other of the inner side or the outer side of the first array. Also, in other embodiments the first array includes n magnetic segments and the field pattern among every one of the n segments is characterized by a rotational shift in the angular orientation relative to the angular orientation of the field pattern of the next element in the sequence. The second array may include m magnetic segments with m>n and with the field pattern among every one of the m segments characterized by a rotational shift in the angular orientation relative to the angular orientation of the field pattern of the next or the prior element in the sequence. The first array may include n magnetic segments with the field pattern among fewer than every one of the n segments characterized by a rotational shift in the angular orientation relative to the angular orientation of the field pattern of the next element in the sequence.

Also, in accord with the invention, there is provided a synchronous electric machine having a first rotor and a stator winding each coaxial with respect to the other about a central axis extending in a direction along a frame, with the stator fixedly attached to the frame and the first rotor attached to the frame for rotation relative to the frame and the stator winding. The first rotor and the stator winding each have a circumferential surface extending along the central axis. The first rotor includes a first plurality of discrete magnetic segments with each segment: (i) having an elongate length, relative to its width, along a major side thereof, in a direction parallel to the central axis; (ii) including a pole with a like characteristic field distribution including a maximum field strength direction and the same maximum field strength; (iii) having a surface, with a predefined shape in cross section, from which the maximum field strength direction points outward therefrom, about which the segment is rotatable prior to fixed placement in a first array of like magnetic segments circumferentially positioned about the central axis; (iv) fixedly arranged with its major side extending in a direction parallel to the major sides of other segments in the first plurality; (v) extending along the central axis to collectively form, in combination with others in the first plurality, the first circumferential array of magnetic segments having an inner side facing the central axis and an outer side facing away from the central axis; and (vi) positioned in sufficient proximity to one or more other segments to additively combine or reduce fields from different segments and thereby impart net field strengths about the first circumferential array wherein an augmented magnetic field strength results on one of the inner side or the outer side of the first array relative to a reduced magnetic field strength on the other of the inner side or the outer side of the first array. The major sides of the segments in the first plurality may, for example, be cylindrically shaped or elliptically shaped such that the predefined shape in cross section is circular or elliptical. The major sides of the segments in the first plurality may be, but are not limited to, shapes which are axially symmetric. In one series of embodiments all magnetic segments in the first array consist only of the segments in the first plurality.

In another series of embodiments all segments in the first array are dipole magnets. The first array of magnetic segments may be configured to provide a sequence of the segments comprising rotationally shifted angular orientations of magnetic field patterns where, along the sequence, the angular orientations of field poles among different ones of the discrete magnetic segments are rotated as a function of position in the sequence (e.g., having, from each segment to a next segment in the sequence, a fixed angle shift in orientation in the same rotational direction about the segment axes, the shifts being in directions orthogonal to the central axis. In one example embodiment the shifts provide a sequence of rotations in the angular orientations of the field poles, including rotations in maximum field strength directions. The magnitude of the augmented magnetic field strength, on one of the inner side or the outer side of the first array relative to the reduced magnetic field strength on the other of the inner side or the outer side of the first array, may depend in part on the number of segments per pole and the specific sequence of and angle(s) of rotation of the field poles. For another series of embodiments, with the first array including n magnetic segments the field pattern among every one of the n segments is characterized by a rotational shift in the angular orientation relative to the angular orientation of the field pattern of the next element in the sequence. When the first array includes n magnetic segments, the field pattern among fewer than every one of the n segments may be characterized by a rotational shift in the angular orientation relative to the angular orientation of the field pattern of the next element in the sequence. The major sides of magnetic segments in the first array may be spaced apart from one another or in contact with one another.

Embodiments of the afore described synchronous electric machine may include a second rotor where: the stator winding extends between an inner stator winding distance $W_i$ and an outer stator winding distance $W_o$, each stator winding distance $W_i$ and $W_o$ measured from the central axis; the first rotor is an inner rotor, IR, extending between an inner distance $IR_i$ and an outer distance $IR_o$, each distance $IR_i$ and $IR_o$ measured from the central axis, where $IR_o<W_i$. With the machine comprising the second rotor positioned as an outer rotor, OR, relative to the inner rotor, IR, and attached to the frame for rotation relative to the frame and the stator winding, the second rotor, OR, extends between an outer rotor inner distance ORi and an outer rotor outer distance, ORo, with each distance $OR_i$ and $OR_o$ measured from the central axis, the outer rotor, OR, having a circumferential or cylindrical-like surface extending about the central axis. The outer rotor, OR, comprises a second plurality of discrete magnetic segments, each segment in the second plurality having a characteristic field pattern and: (i) is fixedly arranged in spatially parallel orientations with respect to one another; (ii) extends about the central axis to collectively form a second circumferential array; (iii) is positioned in a second stabilizing structure; and (iv) is rotatable about the central axis to interact with the stator winding for torque generation.

For the afore described machine comprising a second rotor, the second array of magnetic segments may be configured to provide a sequence of elements comprising rotationally shifting angular orientations of magnetic field patterns where the angular orientation of field patterns rotates among different magnetic elements in directions orthogonal to the central axis. The spatial rotation of the field patterns may configure the flux in a manner which provides an augmented magnetic field strength on one of an inner side or an outer side of the second array relative to providing a reduced magnetic field strength on the other of the inner side or the outer side of the second array. With the first array including n magnetic segments, in one embodiment the field pattern among every one of the n segments is characterized by a rotational shift in the angular orientation relative to the angular orientation of the field pattern of the next element in the sequence. Where the second array includes m magnetic segments, with m>n, according to another embodiment the field pattern among every one of the m segments is characterized by a rotational shift in the angular orientation relative to the angular orientation of the field pattern of the next element in the sequence. For a different series of embodiments, with the second array including m magnetic segments, with m>n, or m<n, the field pattern among fewer than every one of the m segments is characterized by a rotational shift in the angular orientation relative to the angular orientation of the field pattern of the next element in the sequence.

In accord with another series of embodiments, there is, provided a synchronous electric machine, comprising a first rotor and a stator winding each coaxial with respect to the other about a central axis which extends in a direction along a frame, with the stator winding fixedly attached to the frame and the first rotor attached to the frame for rotation relative to the frame and the stator winding. The first rotor and the stator winding each have a circumferential surface extending along the central axis, with the first rotor comprising a first plurality of discrete magnetic segments with each segment: (i) having an elongate length, relative to its width, extending along a major side thereof in a direction parallel with the central axis; (ii) including a pole with a like characteristic field distribution including a maximum field strength direction and the same maximum field strength; (iii) having a surface, with a predefined shape in cross section, from which the maximum field strength direction points outward therefrom, about which surface the segment is rotatable prior to fixed placement in a first array of like magnetic segments circumferentially positioned about the central axis; (iv) fixedly arranged with its major side extending in a direction parallel to the major side of other segments in the first plurality; (v) including a pole having a like characteristic maximum field strength direction; and (vi) positioned to extend in a direction parallel with the central axis to collectively form, in combination with others in the first plurality, the first circumferential array of like magnetic segments, which array is configured in a sequence having the poles of the magnetic segments rotated with respect to one another as a function of position in the sequence, this resulting in shifts in angular orientations of the field poles among the magnetic segments.

Major sides of the magnetic segments in the first plurality may be cylindrically shaped or elliptically shaped such that the predefined shape in cross section is circular or elliptical. Each major side of each of the segments in the first plurality may be axially symmetric. The first array may consist only of the discrete magnetic segments in the first plurality. All of the segments in the first array are dipole magnets. For some embodiments of the machine multiple segments in the first plurality are not pie shaped elements and are not formed into asymmetrically shaped elements in which the maximum field strength direction changes as a function of position about the element shapes. In other embodiments multiple segments in the first plurality are not formed into asymmetrically shaped elements after magnetization so that the maximum field strength direction would vary as a function of position about different ones of the shaped elements. In a N-S field system of a magnetic segment, the maximum field strength direction of a pole type changes in a sequence of angular shifts. That is, magnetization directions change between segments in the sequence by steps of a predetermined angle.

According to disclosed embodiments of the invention, none of the segments in the first plurality are first formed as identical magnetized elements, then shaped or machined from the identical elements into differing shapes. For the conventional series of differently shaped elements, the maximum field strength direction varies as a function of position about the nonsymmetric shapes.

However, for the afore described machine, embodiments of the magnetic segments can have identical symmetrical shapes and, with the first circumferential array of magnetic segments having an inner side facing the central axis and an outer side facing away from the central axis, an augmented magnetic field strength results on one of the inner side or the outer side of the array relative to a reduced magnetic field strength on the other of the inner side or the outer side of the array. Also according to other embodiments, when the first circumferential array of magnetic segments rotates about the central axis, the field on the side of the array exhibiting the augmented magnetic field strength primarily interacts with fields of the stator winding for torque generation. Embodiments of the afore described machine include a support structure having a series of apertures therein and formed along a cylindrically shaped plane with each in the first plurality of discrete magnetic segments rotatably positioned and fixed in place within one of the apertures to provide the angular shifts. Such a support structure may comprise a series of stamped laminations joined against one another wherein the laminations comprise nonmagnetic material.

The afore described machine may include an inner rotor, IR, and an outer rotor, OR. For example, with the stator winding radially extending between an inner stator winding distance $W_i$ and an outer stator winding distance $W_o$, and each stator winding distance $W_i$ and $W_o$ measured from the central axis, the first rotor is positioned to extend between an inner distance $IR_i$ and an outer distance $IR_o$, each distance $IR_i$ and $IR_o$ measured from the central axis, where $IR_o<W_i$. With the machine further comprising an outer rotor, OR, positioned as an outer rotor relative to the inner rotor, IR, and attached for rotation relative to the frame and the stator winding, the second rotor, OR, extends between an outer rotor inner distance $OR_i$ and an outer rotor outer distance, $OR_o$. Each distance $OR_i$ and $OR_o$, is measured from the central axis, and the outer rotor, OR, has a circumferential or cylindrical-like surface extending along the central axis. The outer rotor, OR, comprises a second plurality of discrete magnetic segments, with each segment in the second plurality having a characteristic field pattern, the second plurality of magnetic segments: (i) are fixedly arranged spatially parallel orientation with respect to one another; (ii) extend along the central axis to collectively form a second circumferential array about the central axis; (iii) are positioned in a second stabilizing structure; and (iv) are rotatable about the central axis to interact with the stator winding for torque generation. The second plurality of magnetic segments may be configured into a sequence providing rotationally shifted angular orientations of magnetic field patterns, where the angular orientations of field patterns in different segments rotate between each segment and the next magnetic segment, i.e., as a function of position in the sequence in directions orthogonal to the central axis. This is observable by spatial rotation of the maximum field strength direction of a pole. The spatial rotation of the field patterns may configure the flux in a manner which provides an augmented magnetic field strength on one of the inner side or the outer side of the second circumferential array, relative to providing a reduced magnetic field strength on the other of the inner side or the outer side of the second circumferential array. The first array may include n magnetic segments and the field pattern among every one of the n segments may be characterized by a rotational shift in the angular orientation relative to the angular orientation of the field pattern of the next element in the sequence. According to another embodiment, with the second array including m magnetic segments the field pattern among every one of the m segments is characterized by a rotational shift in the angular orientation relative to the angular orientation of the field pattern of the next element in the sequence. According to still another embodiment, with the second array including m magnetic segments, the field pattern among fewer than every one of the m segments may be characterized by a rotational shift in the angular orientation relative to the angular orientation of the field pattern of the next element in the sequence. Specifically, the maximum field strength direction of a pole in each among the fewer than every one of the m segments may be characterized by a rotational shift in the angular orientation relative to the angular orientation of the maximum field strength direction of a like pole in the next segment in the sequence.

There is also provided a method of assembling a synchronous machine. A first rotor and a stator winding are attached about a frame, each of the first rotor and the stator winding being coaxial with respect to the other about a central axis which extends in a direction along the frame, with the stator winding fixedly attached to the frame and the first rotor attached to the frame for rotation relative to the frame and the stator winding. Each of the first rotor and the stator winding is formed having a circumferential surface extending along the central axis, wherein the first rotor is formed with at least a first plurality of discrete magnetic segments configured in a first array, with each segment: (i) having an elongate length, relative to its width, extending along a major side thereof in a direction parallel with the central axis; (ii) including a like pole having a like characteristic field distribution including a maximum field strength direction and the same maximum field strength; (iii) having a surface, with a predefined shape in cross section, from which the maximum field strength direction points outward therefrom, about which surface the segment is rotatable prior to fixed placement of the segment in the first array of like magnetic segments circumferentially positioned about the central axis, the first array of magnetic segments having an inner side facing the central axis and an outer side facing away from the central axis; (iv) fixedly arranged with its major side extending in a direction parallel to directions which the major sides of other segments in the first plurality extend; and (v) positioned to extend in a direction parallel with the central axis to collectively form, in combination with others in the first plurality, the first array of like magnetic segments, which first array is configured as a first ordered sequence having field poles of the magnetic segments rotated with respect to one another as a function of position in the first sequence, this resulting in shifts in angular orientations of the field poles among the magnetic segments in the first sequence, the shifts resulting in an augmented magnetic field strength on one side of the first array relative to a lower magnetic field strength on the other side of the first array.

There is also provided a magnetic system suitable for use in a rotating machine or a gear box, having at least a first array structure containing at least a first plurality of like discrete magnetic segments and extending along a central axis with each segment in the first plurality: (i) having an elongate length, relative to its width, extending along a major side thereof in a direction parallel with the central axis; (ii) including a like pole with a like characteristic field distribution including a maximum field strength direction and the same maximum field strength; (iii) having a surface, with a predefined shape in cross section, from which the maximum field strength direction points outward, about which surface the segment is rotatable prior to fixed nonrotatable placement of the segment in the first array of like magnetic segments circumferentially positioned about the central axis; (iv) fixedly arranged with its major side extending in a direction parallel to directions which the major sides of other segments in the first plurality extend; and (v) positioned to extend in a direction parallel with the central axis to collectively form, in combination with others in the first plurality, the first array of like magnetic segments, which first array is configured as a first ordered sequence having field poles of the magnetic segments rotated with respect to one another as a function of position in the first sequence, this resulting in shifts in angular orientations of the field poles among the magnetic segments in the first sequence. In one embodiment shifts in angular orientations corresponds to rotations in directions that the maximum field strength of each segment points.

In one series of embodiments of the afore described magnetic system, segments in the first plurality are positioned in contact with, or in sufficient proximity to, one or more other segments to additively combine or reduce fields from different segments and thereby impart net field strengths about the first array structure wherein an augmented magnetic field strength results on one of the inner side or the outer side of the array relative to a reduced magnetic field strength on the other of the inner side or the outer side of the array. The magnetic segments may be entirely in an ordered sequence wherein the magnetic segments are axially rotated with respect to other magnetic segments to sequentially shift orientations of the characteristic maximum field strength direction among the segments and thereby effect the augmented magnetic field strength on one side of the array. The magnetic system may further include a support structure with which: the magnetic segments of the first plurality occupy fixed positions relative to the central axis and relative to one another, and the relative shifts in orientations of the characteristic maximum field strength directions among the field poles is fixed. The support structure may include a series of channels, apertures or grooves in which the magnetic segments are placed. Accordingly, the magnetic segments and the channels or grooves may have complementary shapes or mating features which lock the rotational positions of segments in place to fix the relative shifts in field orientation in place. In disclosed embodiments, the support structure may include a series of apertures formed therein and formed along the central axis, with discrete magnetic segments in the first plurality axially rotated and positioned within the apertures to sequentially provide the shifts along the array. The support structure may be formed of a series of stamped laminations joined against one another wherein the laminations comprise nonmagnetic material.

The exemplary afore described magnetic system includes a second array structure comprising at least a second plurality of like discrete magnetic segments, circumferentially positioned about and extending along the central axis, with each segment in the second plurality: (i) having an elongate length, relative to its width, extending along a major side thereof in a direction parallel with the central axis; (ii) including a pole of like polarity with a like characteristic field distribution including a maximum field strength direction and the same maximum field strength; (iii) having a surface, with a predefined shape in cross section, from which surface the maximum field strength direction points outward, and about which surface the segment is axially rotatable prior to fixed placement in the second array; (iv) fixedly arranged with its major side extending in a direction parallel to directions which the major sides of other segments in the first plurality extend; and (v) positioned to extend in a direction parallel with the central axis to collectively form, in combination with others in the second plurality, the second array of like magnetic segments, which second array is configured as a second ordered sequence having field poles of the magnetic segments rotated with respect to one another as a function of position in the second sequence, this resulting in shifts in angular orientations of the field poles among magnetic segments in the second sequence. The second array of magnetic segments may be configured to provide a sequence of elements comprising rotationally shifting angular orientations of magnetic field patterns where the angular orientation of field patterns rotates among different magnetic elements in directions orthogonal to the central axis. Also, the spatial rotation of the field patterns may configure the flux pattern in a manner which provides an augmented magnetic field strength on one of the inner side or the outer side of the first array relative to providing a reduced magnetic field strength on the other of the inner side or the outer side of the first array. In one embodiment, with the first array including n magnetic segments, the field pattern among every one of the n segments is characterized by a rotational shift in the angular orientation relative to the angular orientation of the field pattern of the next element in the sequence. In another embodiment, with the second array including m magnetic segments, the field pattern among every one of the m segments is characterized by a rotational shift in the angular orientation relative to the angular orientation of the field pattern of the next element in the sequence. In another embodiment, with the first array including n magnetic segments, the field pattern among fewer than every one of the n segments is characterized by a rotational shift in the angular orientation relative to the angular orientation of the field pattern of the next element in the sequence.

Other embodiments of electric machines according to the invention include back iron, e.g., positioned radially outward from the first plurality of magnetic segments in the first array of the first rotor and coaxial with the first rotor, with windings of the stator extending along an air gap between the first rotor and the back iron, to generate an enhanced radial flux density in the air gap. The back iron may be mechanically coupled to rotate with the rotor in synchrony to avoid, reduce or eliminate the presence of a changing field which would cause magnetization losses to occur in the back iron.

When the machine includes flux directing inner back iron, e.g., positioned radially inward from the first plurality of magnetic segments in the first array of the first rotor and coaxial with the first rotor, the inner back iron may be mechanically coupled to rotate in synchrony with the rotor and thereby avoid, reduce or eliminate, the effects of a changing field which would cause magnetization to occur in the back iron.

When the magnetic system includes the second array structure comprising magnetic segments, the system may further include a circumferential array comprising ferromagnetic segments positioned between the first array and the second array in coaxial alignment with each.

BRIEF DESCRIPTION OF THE DRAWINGS

Features and advantages of the present invention will be better understood when the following detailed description is read with reference to the accompanying drawings, where:

FIG. 1 provides a view in cross section of a synchronous machine according to the invention:

FIG. 2*a* is a partial view of a prior art cylindrical magnetic assembly consisting of pie-shaped elements for which magnetization directions are anti-parallel in adjacent segments;

FIG. 2*b* is a partial view a cylindrical magnet assembly consisting of pie-shaped segments for which magnetization directions sequentially rotate between adjoining segments by 45°;

FIGS. 3-7 are side views in cross section of other synchronous electric machines according to the invention, each view taken along and through the center of an axis of rotation of a shaft, where:

FIG. 3 illustrates a segmented rotor magnet assembly;

FIG. 4 illustrates a segmented rotor magnet for which the back iron is not fixed to the machine housing but, rather, is mechanically coupled to rotate with the rotor;

FIG. 5 illustrates a segmented rotor magnet assembly located on the outer periphery of the machine with the back iron adjacent the machine shaft and attached to the machine housing, FIG. 6 illustrates a segmented rotor magnet assembly where, instead of being fixed to the machine housing, the back iron is mechanically coupled for rotation with the rotor.

Figure 3:
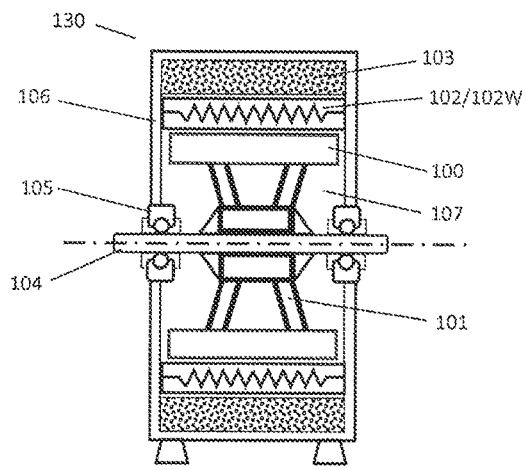

Discrete magnetic segments or associated apertures in which the segments are placed are indicated in the figures with circular or ellipsoidal shapes but numerous other shapes in cross section are contemplated, including multi-sided or asymmetric rods and apertures. Arrows drawn within the shapes correspond to magnetization directions or rotational shifts of the placed segments or orientations of apertures in which the segments are placed.

Like reference numbers are used throughout the figures to denote like components. Features of the invention are illustrated schematically, it being understood that various details, connections and components of an apparent nature are not shown in order to emphasize features of the invention. Various features shown in the figures are not to drawn scale.

DETAILED DESCRIPTION OF THE INVENTION

Before describing in further detail the particular features related to embodiments of the invention, it is noted that the present invention resides primarily in a novel and non-obvious combination of components and process steps. So as not to obscure the disclosure with details that will be readily apparent to those skilled in the art, certain conventional components and steps have been omitted or presented with lesser detail, while the drawings and the specification describe in greater detail other elements and steps pertinent to understanding the invention. The disclosed embodiments do not define limits as to structure or method according to the invention, but only provide examples which include features that are permissive rather than mandatory and illustrative rather than exhaustive. Further, to assure clarity in describing the invention and the scope of what is claimed, a brief explanation of terminology is provided.

"Aperture" as used herein refers to an opening, a hole, or a space which need not be completely enclosed. In the context of the many possible designs of support structures suitable for creating a FDM ring assembly, an aperture may be a tunnel or a groove or slot into which a magnetic segment can be securely fixed in place notwithstanding rotational or centrifugal forces during machine operation.

"Circumferential" as used herein refers to a configuration which extends partly or entirely around an axis or a body shape, e.g., a rotor, a stator, or an array of segments 100. For example, the outer surface of a closed body shape, e.g., a stator winding, which extends along a straight axis and completely around the axis, has a circumferential shape because the outer surface extends partly or completely around the axis. The closed body shape may, for example, be that of an electric winding, e.g., having a cylindrical, or cylindrical-like, body shape extending along the axis.

"Circumferential array" refers to an array of segments 100 arranged circumferentially about an axis or around a body shape.

"Cylindrical array of segments" refers to an array of discrete magnetic segments 100 configured in a series, e.g., a series of bar magnets, which extends partly or entirely circumferentially around an axis or a body shape where the segments may be arranged as a sequence of parallel segments to provide spatial attributes along a real or imaginary cylindrical surface. The spatial attributes may relate to spatial geometric features or to magnetic field distributions and magnetic flux densities as a function of position about the real or imaginary cylindrical surface.

"Cylindrical-like" refers to a shape which is similar to or sufficiently approximates the shape and symmetry of a cylindrical body even though the body may have multiple distinct wall portions or variations in diameter.

A "discrete magnetic segment", also referred to as a segment or a magnetic segment 100, is a permanent magnet or an electromagnet (e.g., a normal conducting or a super-conducting coil). In the case of a permanent magnet, the segment may be in the form of a rod-shaped, i.e., elongate, structure. Exemplary segments, are rod shaped structures having a largest dimension extending along a first axis, e.g., compared to, for example, dimensions along a plane orthogonal to the first axis, the first axis referred to as the elongate axis. The elongate structure may be monolithic or may comprise multiple subsegments, i.e., multiple magnets, which are smaller in size and arranged end to end, e.g., along the elongate axial length, to realize a desired length of the segment. Suitable permanent magnet segments are not limited to any particular shape in cross section and such segments, disclosed for use in embodiments of the invention, may have an elongate shape extending along a straight or a curved axis without being limited to any specific set of shapes in cross section (e.g., as would be seen in sectional views taken along planes orthogonal to the elongate axis). Such segment cross-sectional shapes may, for example, be circular, cylindrical, elliptical, polygonal, symmetric, or asymmetric.

The term "flux channeling", in the context of magnetic fields refers to field interactions or resulting net characteristics, e.g., field bending deformations. In the disclosed embodiments flux channeling results from an array of adjoining or adjacently positioned magnetic segments. For embodiments of the invention comprising an array of magnetic segments, flux channeling may be applied to create an augmented magnetic field strength on one side of the array relative to a reduced magnetic field strength on another side of the array. More generally, flux channeling occurs in arrays of magnets, including conventional Halbach-like assemblies, circumferentially arranged along a rotor body to modify the field distribution of the magnets in the stator air gap. Embodiments of the invention effect increases in flux density along the stator air gap by circumferentially arranging magnetic segments to provide an improved rotating sequence of magnetic fields (e.g., more closely comporting with ideal analytics described by Eqns 1 and 2), the combination of which fields creates net field distributions that more effectively and practically increase the flux density along the stator air gap and thereby increase the Lorentz forces.

"Rod shaped structure" refers to a member having an elongate or large length, relative to a small width, the member extending along a straight or curved axis without there being a limitation on the shape or width of the structure as viewed along a plane orthogonal to the major axis. Discrete magnetic segments used to form arrays according to the invention are generally elongate, centered or extending about a major axis, and may have a variety of shapes in cross section, i.e., along a plane orthogonal to the major axis. The major axis may be curved.

The terms "radially outward" and "radially inward" refer to positions which are, respectively farther away from or closer to an axis or a position relative to another feature. For example, with a winding circumferentially positioned about an axis, an array of magnets may be positioned: (i) radially outward from the winding and the central axis, i.e., further away from the central axis, or (ii) radially inward from the winding and closer to the central axis.

"Shape in cross section" means, with respect to a discrete magnetic segment or a coil, a shape along a plane orthogonal to the major axis of the segment, e.g., a straight or curved axis along the directions in which the elongate shape extends.

FIG. 1 illustrates an embodiment of an improved radial flux synchronous machine 120 according to the invention. Further improvements are shown in the machine designs of FIGS. 3-7 and 12 and in the Flux-Directed Magnetic (FDM) ring assemblies and component support structures shown in FIGS. 8-11. The underlying design concepts are identical for generators and motors. In the case of a generator, mechanical energy is supplied to the rotating shaft 104 of the machine. The mechanical energy is converted to electric energy made available as an output from the stator windings 102W. In the case of a motor, for any kind of propulsion, electric energy is supplied to the stator windings 102W and converted to mechanical energy made available at the rotating shaft 104.

The schematic layout shown in FIG. 1 illustrates basic functional components of the synchronous electric machine 120. The stator 102 is fixedly attached to the machine frame 106. The stator 102 and the rotor 101 are concentrically situated along a common axis, A, with coils of the stator windings 102W configured as saddle coils extending along the cylindrical surface of the stator body 102B for current flow primarily in the axial direction, i.e., along the direction in which the shaft 104 extends. The stator 102 of this synchronous machine may be formed with multiple saddle coils to create multiphase windings 102W (only shown schematically) having appropriate phasing to generate rotating magnetic fields. Ideally and optimally, it is desirable for the field lines of the rotor to extend radially with respect to the common axis, A, i.e., in radial directions orthogonal to the primary directions of current flow in the stator windings.

The rotor 101, which transfers mechanical energy into or out of the system, is coupled to the machine shaft 104. As indicated in FIG. 1, the rotor 101 comprises a rotor body 101B and a plurality of magnets 101M circumferentially arranged to direct radial flux outward toward the stator windings 102W. In the illustrated embodiment the rotor magnets 101M are affixed along the along the outside of the rotor body to direct flux into an air gap along which the stator windings reside. In other embodiments the magnets 101M may be attached directly to the shaft without an intervening rotor body 101 as shown in FIG. 7b where a Flux-Directed Magnetic (FDM) Ring Assembly is directly attached to the rotatable shaft 104. The rotor is surrounded by the concentric back iron 103, along which the air gap, G, resides between the rotor and the back iron. The saddle coil stator windings 102W are located primarily in the air gap, G. The rotor comprises conventional permanent bar magnets or electromagnetic coils, M. In other embodiments such as shown in FIG. 3, the rotor may comprise magnetic segments 100 which may be configured to provide flux channeling as further described herein. The rotor 101 provides a magnetic field in the air gap for coupling with the field generated by the stator windings 102W. To convert mechanical energy to electric energy, when the rotor 101 is turned by an application of torque to the shaft 104, interaction between the changing flux of the rotor and current flow in the stator windings induces an electromotive force (emf) at the terminals of the stator winding and the system operates as a generator. In the case of motor operation, when alternating voltages with appropriate phase shifts between them are applied to excite the stator windings 102W, a rotating magnetic field is generated around the axis of the machine. Interaction between the rotating field generated by the stator windings and magnetic fields of the magnetic segments 100 turn the rotor in synchronization with the frequency of the alternating voltage applied to excite the stator winding.

To achieve maximum energy transfer between the rotor magnets 100 and stator windings 102, the field which extends into the stator winding air gap, G, from the rotor magnets, must be oriented in radial directions with respect to the axis, A. As described for a conventional motor, the Lorentz force, F, acting on a conductor of the stator winding is given by F=I×B, where all quantities are vectors. I represents the current in the stator winding 102. B is the magnetic flux density, provided by the rotor magnets in the airgap, which interacts with the current I flowing through the stator windings. The force given by the vector cross product has its maximum value when the direction of current, I, and the direction of the flux density, B, are perpendicular to each other. The Lorentz force is zero when the angle between the two quantities is 0°. As can be seen from this relationship, the machine power is optimized when the field direction of the rotor is in the radial direction relative to the common axis, A, since the conductors of the stator winding are primarily oriented in the axial direction. With the back iron 103 surrounding the field generating rotor, the field lines of the rotor can be more closely aligned to the radial direction. The power of a synchronous machine is given by the relationship:

$$P \propto \pi^2 \omega * L * D^2 * B_R * A_S \qquad \text{Eqn. 3}$$

where $\omega$ represents the rotational speed, L is the axial length of the machine, D is the average diameter of stator windings in the airgap, $B_R$ is the flux density in the air gap and $A_S$ is the current loading of the stator winding. The equation shows that the power of the machine is proportional to the flux density $B_R$ in the air gap at the stator winding. The flux density of a cylindrical system as needed for the rotor can be enhanced if the system comprises a flux channeling array of magnetic elements as present in a cylindrical Halbach array. For this magnet configuration each of multiple magnetic poles is formed as a sequence of magnetic elements, wherein the magnetization directions of the individual elements in each sequence change in orientation from element to element.

That is, a conventional array of permanent magnets in a motor rotor has the north poles on one side of the array and the south poles on the opposing side of the array; but, by appropriately rotating the magnetization direction from element to element in each pole sequence, the flux of the magnets in each sequence can be bent, i.e., channeled, to almost entirely emerge on only one side of the array. In this case, a ring assembly of the rotor magnets, consisting of permanent magnets or electromagnets, can produce substantially only an inward or only an outward directed magnetic flux with respect to the air gap. Due to the field bending (referred to as flux channeling), the emerging flux is not only largely limited to one side of the array of rotor elements, but also leads to a significant enhancement of the flux density on said one side of the array of motor elements in comparison to a conventional array of rotor magnet elements having all of the north poles on one side of the array and all of the south poles on the opposing side of the array. In some cases, the field bending achievable with the flux channeling array according to the invention can be enhanced by as much as a factor of two.

In principle, the power of a synchronous machine can be significantly enhanced if the field-generating rotor system is implemented as a flux-channeling array, e.g., with a conventional Halbach array comprising pie-shaped magnetic elements, instead of the conventional assembly of magnets that have all north poles positioned on a different side of the array than the south poles. Some of the advantages of an electric machine incorporating a flux-channeling array over the conventional system are evident from a comparison between performance for the conventional magnet assembly as illustrated FIG. 2a, and performance for a system incorporating conventional flux channeling arrays as illustrated in FIG. 2b, FIGS. 2a and 2b each illustrate a partial view of an array of pie-shaped magnetic elements 121. All of the elements 121 in the array of FIG. 2a have radially directed field magnetization orientations, i.e., with the elements alternately directed radially inward or radially outward, as indicated by arrows.

The partial view of FIG. 2b illustrates two prior art sequences of elements for a pair of adjoining magnetic poles in a conventional Halbach array with each pole consisting of four elements 121. Each pie-shaped element 121 in each sequence shown in FIG. 2b has a different field magnetization orientation as indicated by arrows in FIG. 2b. The field strength characteristic of a permanent magnet depends on the shape of the magnet; and the field is strongly influenced by the presence of ferromagnetic material in the vicinity instead of air. For the assembled pie-shaped elements of FIG. 2b in the presence of back iron 103, the field lines are channeled from element to element based on the lower reluctance of ferromagnetic material in comparison to air.

If, on the other hand, the same pie-shaped element is in air, some of its field lines would return through the element itself, thereby reducing the field that can be measured on the outside. If all pie-shaped elements of a Halbach array are magnetized to the same remanent field $B_{rem}$, the assembled system can be a very good approximation to the ideal field configuration given by Eqn. 1 and Eqn. 2. Based on flux channeling in a complete Halbach array formed about the stator 102, the flux density on the inside 122 of the ring can be enhanced and the flux density on the outside 123 can be substantially canceled, or vice versa (i.e., in which case only the outside of the ring shows substantial flux density). Practically, however, it is complex, time consuming and expensive to manufacture an array of pie-shaped permanent magnet elements with varying magnetization directions about the longitudinal axis of each dement, as shown in FIG. 2b. In part, this is because permanent magnets are produced in rectangular shapes with identical magnetization directions 121. To create a Halbach array from these magnetized parallelepiped structures, the shapes are individually machined according to different orientations of the parallelepiped shape to create identical pie shapes and obtain required shifts in magnetization directions about the common pie shapes. Such rotation is indicated by the arrows in FIG. 2b. Based on the brittleness and hardness characteristics of permanent magnet materials and the strong forces acting in the vicinity of other ferromagnetic materials, the manufacturing and assembly processes are complex, challenging and less practical than desired for many applications.

Furthermore, assembling the pie shaped pieces into a donut-like shape, in the presence of strong opposing magnetic forces, and then bonding them to one another, is difficult and, in some applications, borders on being an impractical process. The resulting assembly would normally be overwrapped to achieve mechanical robustness. For many applications, the final cost of such assemblies exceeds the resulting advantages such that it appears more economical to increase power and torque simply by increasing the size of a conventional machine.

FIG. 2b illustrates two magnetic poles of a complete Halbach array in which each pole consists of four elements 121. Each pie-shaped element 121 of the array has a different magnetization orientation. The field strength of a permanent magnet depends on the shape of the magnet and the field is strongly dependent on the presence of ferromagnetic material in the vicinity instead of air. For the assembled pie-shaped segments the field lines are channeled from segment to segment based on the lower reluctance of ferromagnetic material in comparison to air. If, on the other hand, the same pie-shaped element is in air, some of its field lines would return through the element itself, thereby reducing the field that can be measured on the outside. Pie-shaped pieces 121 with arbitrary magnetization directions have no symmetry in respect to their magnetization direction. Because of this broken symmetry, pieces with different magnetization directions as shown in FIG. 2b, that do not touch, will show significant differences in their inner and outer flux densities. Consequently pieces with different magnetization directions as shown in FIG. 2b, that do not touch, will not exhibit the same maximum field strength. However, if all pie-shaped elements of a Halbach array are magnetized to the same remanent field $B_{rem}$, and touch each other as shown in FIG. 2B, the assembled system can be an improved approximation of the ideal field configuration given by Eqn. 1 and Eqn. 2.

However, with flux-channeling arrays according to the invention, comprising discrete magnetic segments 100 which, in exemplary embodiments, may all have identical and rotatable magnetization directions (see FIG. 10), it becomes more practical and economically feasible to realize synchronous electric machines yielding at least the same benefits expected from those comprising conventional Halbach arrays such as shown in FIG. 2b.

An embodiment of an exemplary machine 130 according to the invention is schematically shown in FIG. 3, having sets of Flux Directed Discrete Magnetic Segment (FDDMS) Arrays 107, of which only one is schematically shown for simplicity of illustration. The sets of FDDMS arrays 107 are attached to the shaft 104 of the machine to form the field-generating rotor. Generally in the figures, representations of the multiple sets of FDDMS arrays are simplified and not intended to illustrate or define any particular shape in cross section or any limit in the number of segments 100 forming the FDDMS arrays in each set. Shapes of the discrete magnetic segments 100 in FDM ring assemblies comprising the FDDMS arrays may be symmetric or asymmetric when viewed in cross section, whether in the form of permanent magnets or coils. Representations of arrays with illustrations having fewer than four segments, or up to ten magnetic segments 100, or having polygonal shapes is for simplicity of illustration without limiting the number of segments in an array 107 or the shapes of segments in cross section or the scope of embodiments accorded the invention. Rod shapes which are cylindrical, elliptical or axially symmetric are considered advantageous. The FDDMS arrays in each set may be highly varied in the number of magnetic segments, with the FDM ring assemblies possibly ranging up to hundreds or more segments 100 to create very large FDM ring assemblies for very large conventional or superconducting machines.

Nor are the disclosed embodiments indicative of the possible range in the number of poles which can be placed in Flux-Directed Magnetic (FDM) ring assemblies according to the invention, or how many individual magnetic segments 100 may be employed in possible embodiments or how these segments may be oriented with respect to one another in a ring assembly or with respect to the shaft 104.

With the concentric back iron 103, positioned radially outward from and coaxial with the rotor of machine 130, an enhanced radial flux density is generated in the air gap, G, between the field of the rotor 101 and the hack iron 103 where the stator windings 102W are located. However, the efficiency of an electric machine can be substantially impacted by magnetization losses. For example, the back iron 103 of FIG. 3 may be exposed to the changing magnetic field of the rotor. However, magnetization losses can be significantly reduced according to the disclosed designs. Referring initially to the machine 135 of FIG. 4, the back iron 111 is mechanically coupled to rotate synchronously with the rotor 101 so that there is no changing field magnetization in the hack iron 111.

Figure 4:
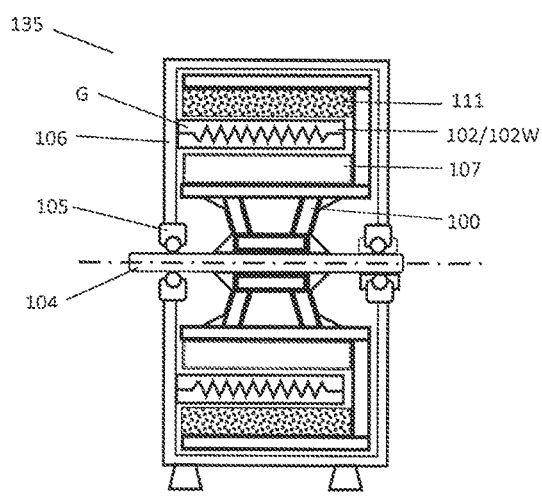
Figure 5:
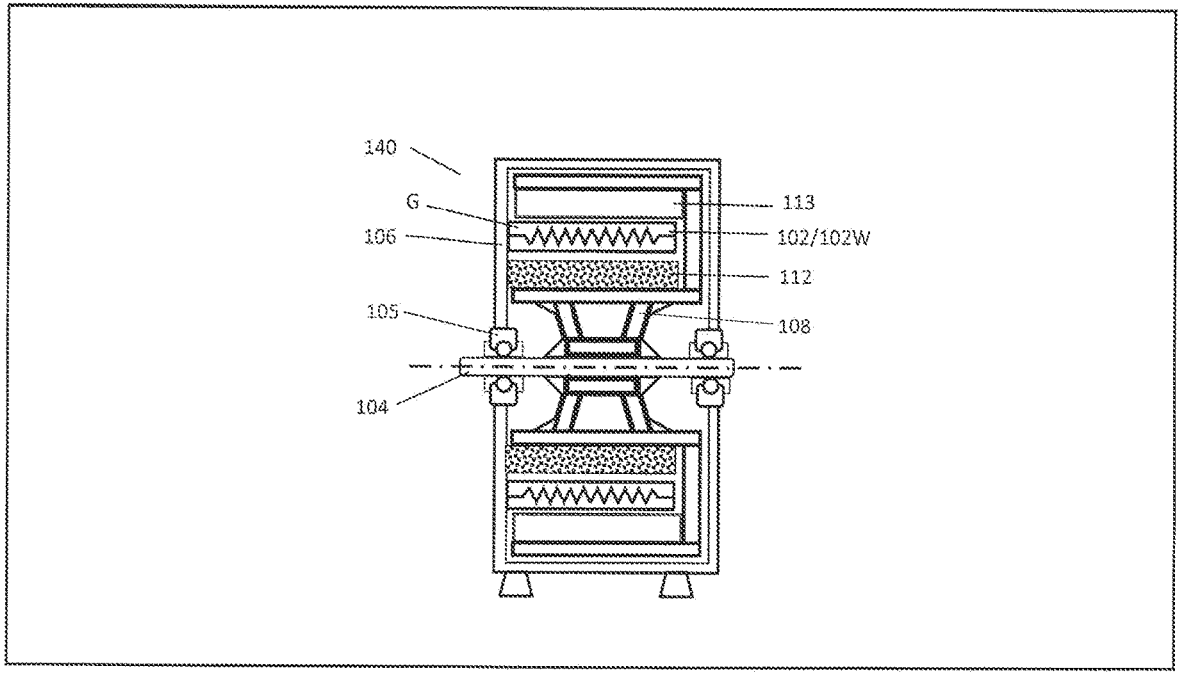

According to other embodiments, in lieu of placing the sets of FDDMS arrays of segments 100 radially inward with respect to the stator winding 102W, as illustrated for the machine 135, the electric machine 140 shown in FIG. 5 has, positioned radially outward with respect to the stator 102, discrete magnetic segments 100 in the form of a first set of Flux Directed Discrete Magnetic Segment (FDDMS) arrays 113. Thus, with segments 100 of the FDDMS array 113 circumferentially positioned radially outward from the stator 102, and in lieu of the back iron 111 shown in FIGS. 3 and 4, the machine 140 includes a plate of flux-directing iron 112 positioned radially inward of the stator 102, i.e., between the stator and the shaft 104 or the central axis, A, In comparison to the machines 130 and 135 of FIGS. 3 and 4, this configuration produces a higher flux density in the air gap, G, between the stator 102 and the rotor magnet array 113, i.e., higher flux density for machine embodiments having the same rotor, stator and gap dimensions, thereby enabling delivery of higher output power and torque density. In this embodiment the flux-directing iron 112 is stationary relative to the stator, being fixedly attached to the frame 106 or the stator. Also, with reference to the machine 45 of FIG. 6, the flux-directing iron plate 112 may be mechanically coupled for synchronous rotation with the flux-channeling arrays 113 to reduce the magnetization losses in the iron (i.e., functionally similar to the arrangement noted for the machine 135 of FIG. 4, having the back iron 111 coupled for synchronous rotation.

Figure 6:
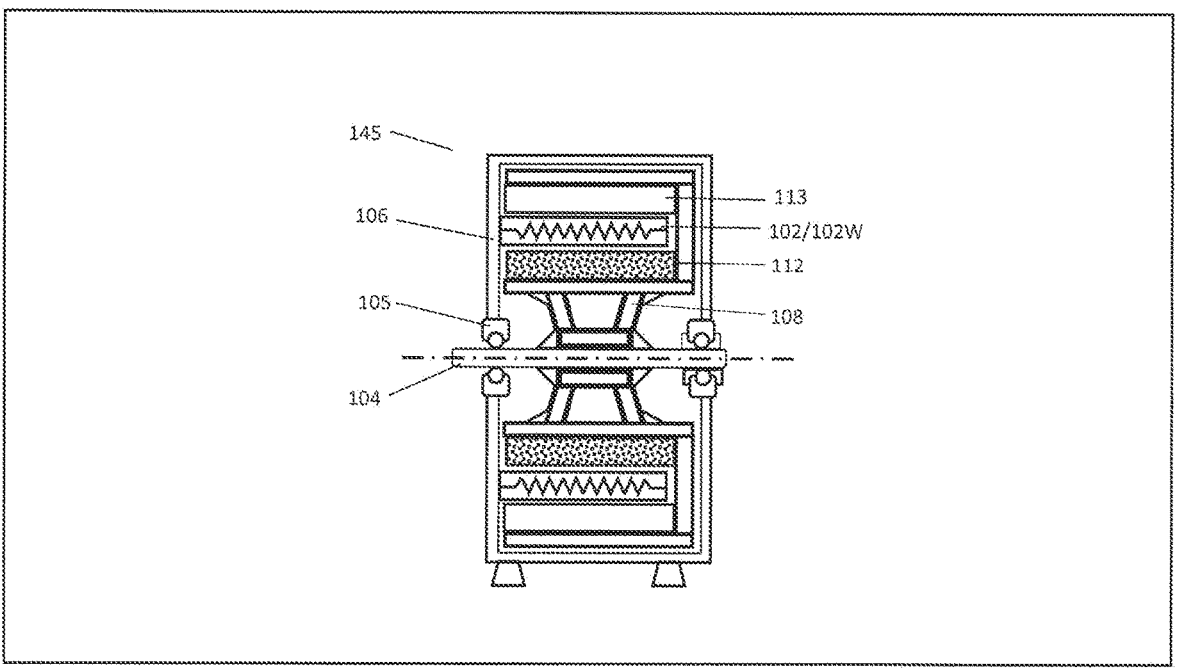
Figure 7A:
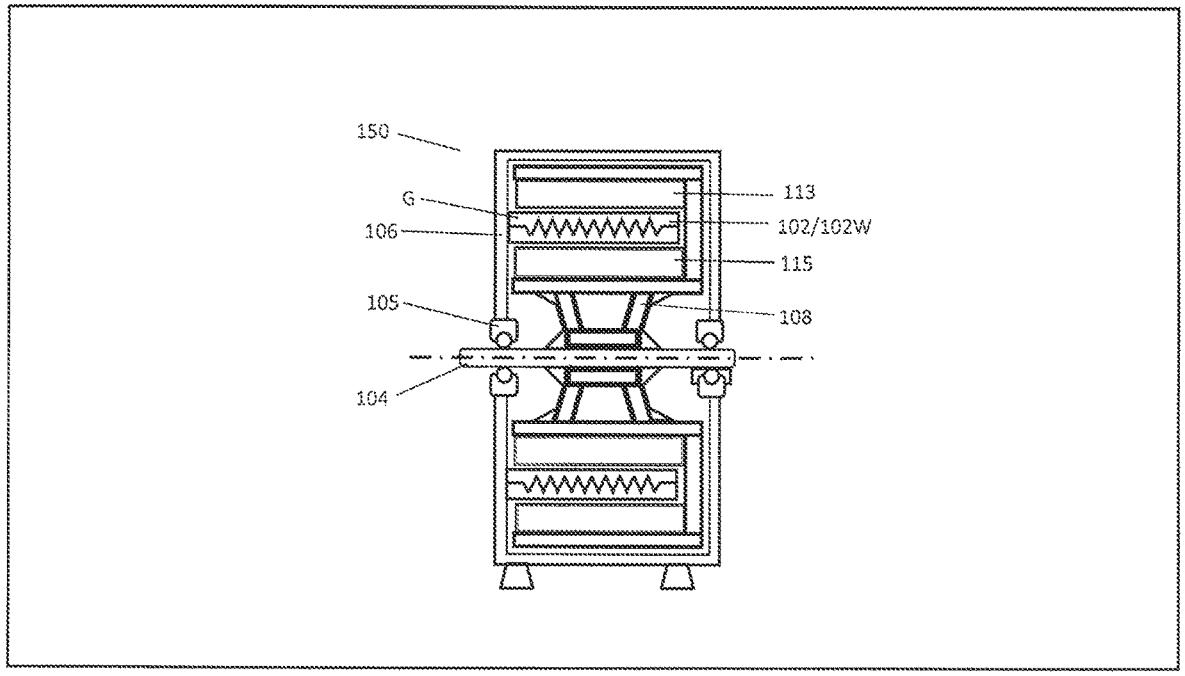
FIGS. 7*a* and 7*b* illustrate embodiments of a synchronous machine with a dual segmented rotor assembly which does not contain back iron.
Figure 7B:
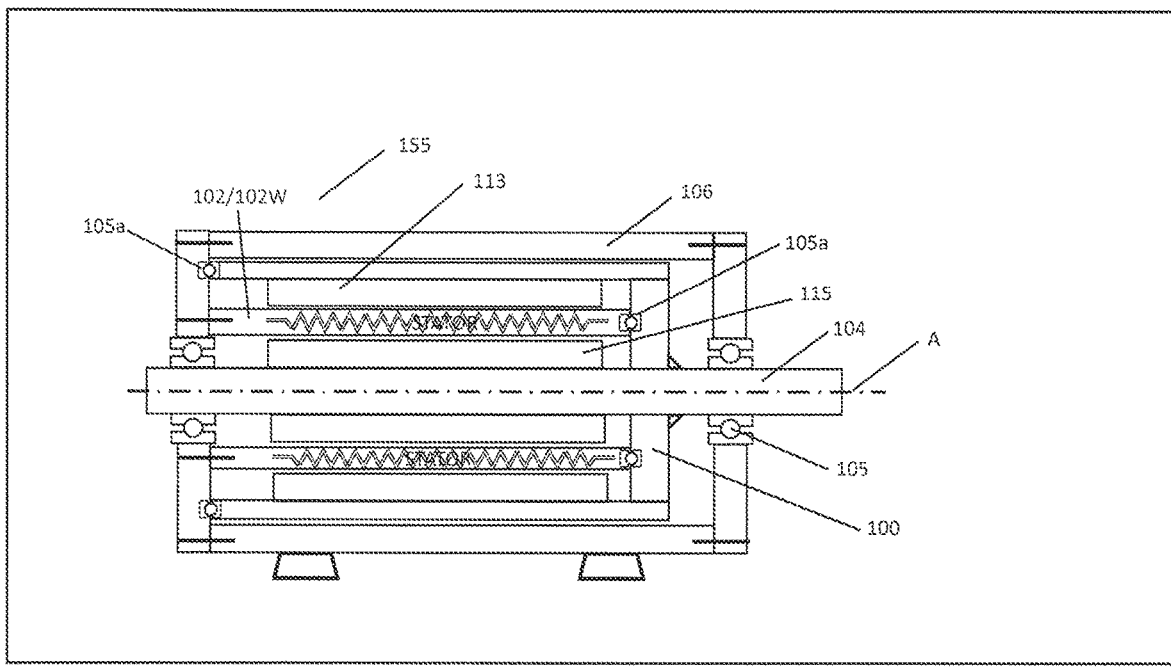

According to still another embodiment of the invention, the design of machine 150 shown FIG. 7a provides further improvement in flux density across the air gap, G, compared to afore described machines having back iron 103/111 or the flux-directing iron plate 112 (e.g., shown in FIGS. 3 to 6). The machine 150 includes a set of FDDMS arrays 113 as shown in machines 140 and 145 of FIGS. 5 and 6. The set of arrays 113 is positioned as a set of outer flux channeling FDDMS arrays that compose an outer, flux-directed, magnetic ring assembly which generates radially inward directed flux into the air gap. The set of FDDMS arrays 115 is positioned as a set of inner flux-channeling FDDMS arrays that compose an inner, flux-directed, magnetic ring assembly which generates radially outward directed flux into the air gap, G. Thus, in lieu of using an iron plate to redirect flux associated with the rotor magnetic segments 100, the machine 150 comprises second sets of FDDMS arrays 115 of magnetic segments 100, positioned as an inner flux channeling flux-directed magnetic ring assembly. In this case, the inner flux-channeling array 115 generates an outward directed flux into the air gap, G, and the outer flux channeling array 113 generates an inward directed flux into the air gap. Advantageously, the opposing flux-channeling arrays 113 and 115 provide: (i) the desired radial flux direction, (ii) lead to a further enhancement of flux density in the air gap based on superposition of flux from the inner and outer sets of FDDMS arrays, and (iii) no further shielding of a fringe magnetic field is required. The two opposing, flux-channeling arrays 113 and 115 are mechanically coupled to the rotor 108 and the shaft 104.

In contrast to a machine configuration that requires back iron 103/111, or the flux-directing iron plate 112 to influence the direction of field lines, the opposing sets of FDDMS arrays yield higher flux densities in the air gap to achieve higher performance. For example, with iron exhibiting magnetic saturation near 2 Tesla, flux densities in the air gap are limited to this field strength. At higher levels near saturation, the iron acts like air, thereby losing its field influencing purpose. Even below two Tesla, the thickness of the hack iron must increase with the flux density in the airgap to direct the field in the airgap in the radial direction and to contain the fringe magnetic field. Increased iron thickness leads to an increase of the machine weight which counteracts the increase in power and torque density resulting from the increase in flux density. With the concept of opposing flux-channeling arrays the limitation of iron saturation is avoided and using superconducting dipole coils instead of permanent magnets with flux densities in the airgap of several Tesla becomes feasible.

Referring next to the dual rotor machine 155 of FIG. 7b, this embodiment is suited to high RPM applications in which large centrifugal forces act on flux-channeled arrays such as the FDDMS array. To mitigate these forces, the aspect ratio of the machine is modified by reducing the radial dimensions and increasing the length in the axial direction. In the machine 155 an inner FDDMS array 115 is directly attached to the rotating shaft of the machine. However, due to the increased length of the machine, the rotor assembly might require an additional support at the end which is not attached to the shaft. This is effected by placing a ring bearing 105a at the cantilevered end. This bearing 105a consists of a groove in the machine housing in which balls at the free end of the rotor 101 are captured. The same issue of a long cantilevered structure exists for the stator winding 102/102W which transfers the torque of the machine to the machine housing 106. To increase the mechanical robustness of the stator, a ring bearing 105a, similar to that provided for the rotor 101, is placed into the rotor structure 101. This bearing keeps the stator 102/102W at the nominal radius counteracting attracting forces generated by the rotor Flux-Directed Magnetic (FDM) ring assemblies 113 and 115. This ring bearing 105*a* maintains the minimum clearance between the rotor assemblies 113 and 115 and the stator to optimize power and torque density.

In U.S. Patent Application publication No. 2018/0226190, a manufacturing process is disclosed for Halbach arrays in which an entire array is magnetized in a single step. This is achieved with the help of magnetization coils that generate a continuously changing flux direction as a function of azimuthal position around the Halbach ring (See Eqn. 1 and Eqn. 2) Application of this technique is best suited to a limited range of array diameters between 50 mm and 200 mm and maximum pole numbers of less than 12. Magnetization of permanent magnet material, such as NdFeB, requires a flux density of several Tesla. This renders fabrication of large continuous Halbach arrays, such as required for wind generators, impractical. The required magnetization coils would be very large and would be accompanied by very large inductances. To generate the required pulsed magnetic field with a flux density of several Tesla would require very high voltages and power. Further difficulty arises for the magnetization of rings for electric machines that require pole numbers of, for example, perhaps more than 20 with a required radial thickness. The inside field characteristic of a multipole coil, such as needed to effect requisite magnetization, falls off with an increasing exponent toward the center points. For a quadrupole, i.e., a system with four poles, the flux density fails off in a linear manner as a function of radius. For the general case of n the flux density falls off as $1/r^{n-1}$. Due to the steep decline of flux density toward the center, it becomes increasingly difficult to achieve a sufficient flux density for magnetization on the inside of a ring-shaped magnet of a given radial thickness. To overcome this effect, very large magnetization fields are required to penetrate the full thickness of the ring with the required flux density for uniform magnetization in the radial direction.

As afore described, the manufacturing complexity of conventional Halbach arrays consisting of pie-shaped, appropriately magnetized segments has prevented their widespread application. For many applications, the final cost of such assemblies exceeds the resulting advantage, and it is more economical to increase power and torque by enlarging the size of a conventional machine.

According to the invention, manufacturing difficulties of incorporating conventional Halbach arrays into rotating machines can be avoided based on designs other than those requiring continuous ring geometries or cylindrical assemblies formed with discrete pie-shaped pieces. Embodiments of the invention provide a flux-channeling magnet assembly comprising segments 100 which are rotatable in place prior to completion of installation. The discrete segments may be permanent magnets or current-carrying normal coils, or superconducting coils arranged in arrays which extend along the contour of a cylindrically shaped surface, i.e., a cylindrical plane. Individual magnetic segments in each array extend in a direction parallel with the central axis of the cylindrically shaped surface, e.g., parallel with a shaft 104.

Figure 8A:
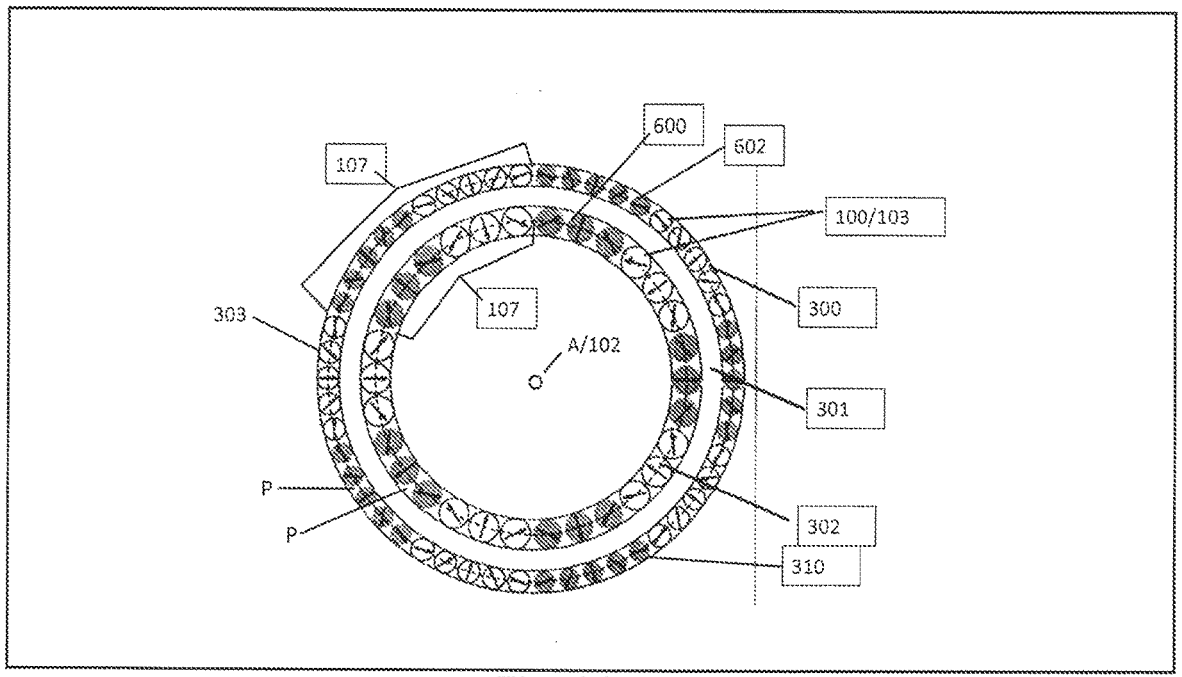
FIG. 8*a* is a view in cross section taken through the shaft of a machine illustrating inner and outer concentric sets of flux-directed magnetic arrays with the inner flux-directed arrays each comprising three discrete magnetic segments per pole and the outer flux directed arrays each comprising five discrete magnetic segments per pole.

FIG. 8*a* illustrates a view in cross section of two Flux-Directed Magnetic (FDM) ring assemblies 300 and 302, referred to as inner and outer rings, configured in a concentric arrangement about axis A. The view is taken along a plane transverse to the axis. With each FDM ring assembly 300, 302 composed of multiple sets of FDDMS arrays, each array is formed with a plurality of magnetic segments 100 extending circumferentially about the central axis, A, or shaft 104. Each FDM ring assembly comprises a support structure 600 or 602 within which sets of FDDMS arrays comprising magnetic segments 100 are configured for field interaction. The FDM ring assemblies 300, 302 each comprise a circumferential sequence of magnetic segments stabilized and circumferentially rotated into an optimal position for radially directing a maximum flux density into the air gap, G.

For the example embodiment of FIG. 8*a*, sets of FDDMS arrays 107 in the same FDM ring assembly 300 or 302 are shown having the same number of segments 100. Advantageously, the segments may each be in the form of an elongate rod-shaped permanent magnet or a dipole coil. In one embodiment, all magnetic segments 100 are axially symmetric rod-like elements and are centered about a segment axis 110 extending along the elongate dimension of the segment. When assembled in a suitable support structure for each of the FDM ring assemblies 300 or 302, the arrangement is operable in applications for motors, generators and magnetic gear assemblies in accord with embodiments of the machines 150 or 155. Exemplary support structures 600 and 602 are cylindrical bodies centered about the axis, A and shaft 104. A circumferential array of apertures 601 is positioned within and concentric with each support structure. See FIG. 9. Example embodiments of the apertures 601 have tube-like shapes symmetrically positioned with other apertures along a cylindrical plane, P. The apertures extend in directions parallel with the axial direction of the shaft 104 for receipt, optimal alignment and mating engagement therein of magnetic segments 100 having a rod-like shape complementary to the tube-like shape. Circles 303 drawn on illustrations of each FDM ring assembly 300, 302 coincide with the symmetric locations of the apertures 601. See FIGS. 8, 10 and 12. The apertures provide for stable mounting in the support structure to prevent movement of the segments 100 away from optimal radial positioning and to prevent deviation from axial alignment with respect to the shaft 104, The circles 303 indicating aperture locations also indicate presence of magnetic segments having been inserted and aligned in the coinciding location of an aperture 601. Features of the afore described support structure in relation to the magnetic segments are that magnetic segments of a first plurality occupy fixed positions relative to the central axis and relative to one another. In example embodiments, each magnetic segment has an elliptical shape and is secured within an aperture having a mating shape. The arrows drawn in each circle 303 indicate the sequential shifting of magnetic field orientation about the major axis of each segment along the sequence of magnetic segments in the circumferential array.

The magnetic segments in each FDDMS array 107 are configured to provide a sequence of rotationally shifted magnetic field patterns having angular orientations where the bodies of the segments are each rotationally shifted about the segment axis from each segment to the very next segment in the sequence to effect the field rotations. In the illustrated embodiment of shifts in angular orientations, for each adjoining pair of magnetic segments 100 in the entire sequence or segments in the FDM ring assembly 300 or 302, the associated field patterns are spatially rotated by the same fixed angle in directions orthogonal to the central axis, A. These sequential rotations of the field patterns along each in the set of FDDMS arrays of the ring assembly configure the net flux in each FDDMS array to provide an augmented magnetic field strength on one side of the sequence of arrays relative to providing a reduced magnetic field strength on the other side of the same sequence of arrays. To this end, for each pair of circles 303 next to one another in the sequence of segments in one or the other of the FDM ring assemblies, the arrows drawn in the circles 303 represent the fixed angle shift in the maximum field strength direction between like poles in the pair. The shift in angle is in a rotational direction relative to the direction of the axis, A, and about the axis.

Selection of the fixed angle shift is determinable based on values of $$B_r = B_{rem} * \cos(p*\theta) \quad \text{(Eqn 1)}$$

and $$B_\theta = B_{rem} * \sin(p*\theta) \quad \text{(Eqn 2)},$$

where $B_{rem}$ is the magnitude of the remanent flux density and p is an integer specifying the number of pole pairs. The subscript "r" denotes the radial component of the field and the subscript "θ" denotes the tangential component of the field. A positive value of p produces a field that is directed in the radially outward direction of the army, and a negative value of p produces a field that is directed in the radially inward direction of the array, i.e toward the central axis of the cylinder. Shapes of the discrete magnetic segments in FDM ring assemblies comprising the FDDMS arrays may be symmetric or asymmetric when viewed in cross section, whether in the form of permanent magnets or coils.

In the disclosed embodiments each magnetic segment 100 is configured with a dipole field pattern extending radially outward from a surface thereof and away from the segment axis. Arrows drawn in each in the sequence of circles 303 in FIG. 8a correspond to the configured sequence of shifts in orientation of the maximum field strength directions of each segment about its segment axis 110. FIG. 8a illustrates these shifts in radial directions of the same one of the two poles (i.e., either North or South) of the dipole magnetic segments.

Figures 9A, 9B:
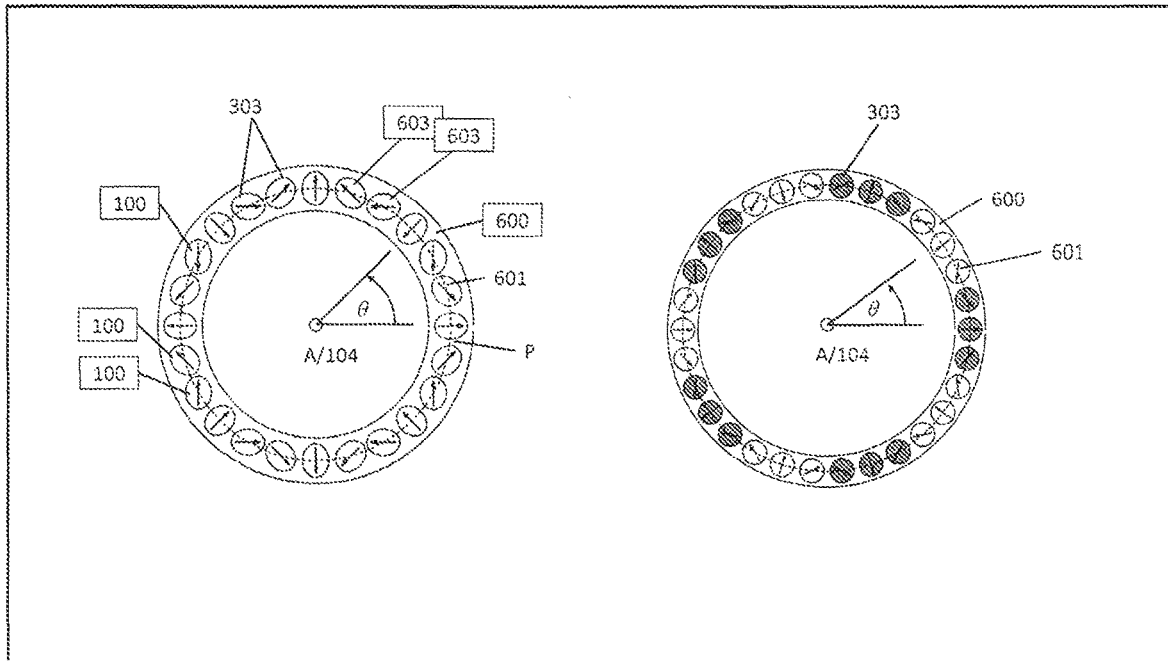
FIG. 9*a* is a view in cross section taken through the shaft of a machine illustrating a laminate support structure in the shape of a cylindrical ring in which arrays of rod-shaped magnetic segments of exemplary elliptical shape are circumferentially arranged, each secured within a mating elliptically shaped aperture, with the arrows indicating magnetic field orientations about the axis of each segment.
FIGS. 9*b* and 9*c* are views in cross section taken through the shaft of a machine illustrating a laminate support structure in the shape of a cylindrical ring in which arrays of spaced-apart rod-shaped magnetic segments of exemplary circular shape are circumferentially arranged, each secured within a mating circular shaped aperture, with the arrows indicating magnetic field orientations about the axis of each segment.
Figures 9C, 9D:
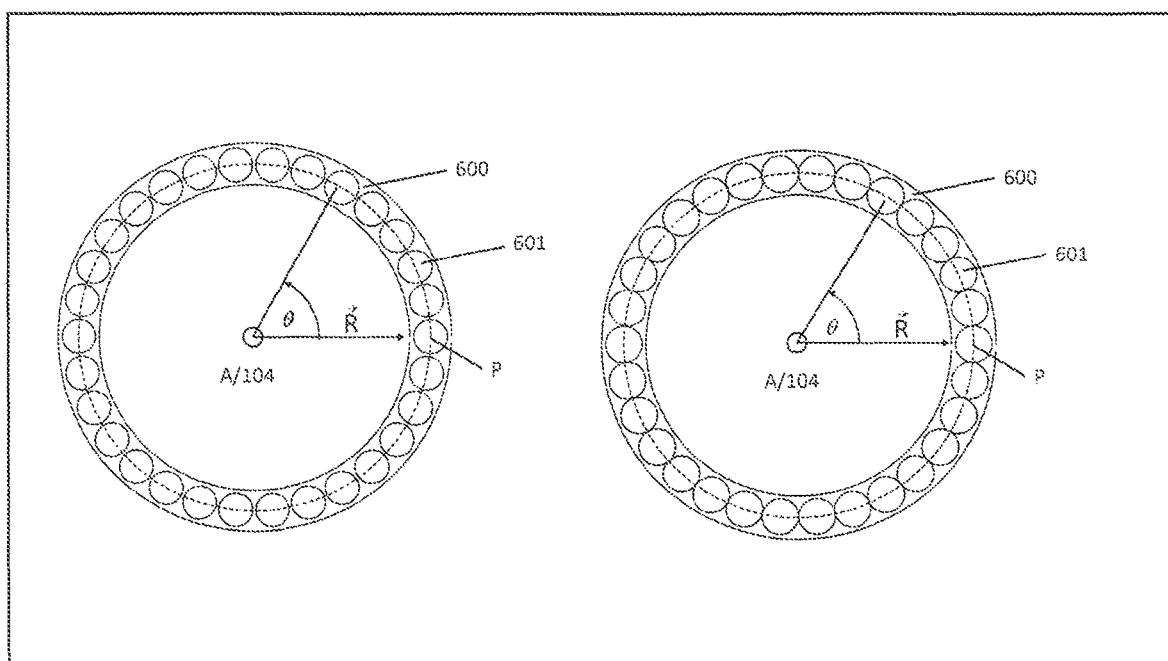
FIG. 9*d* is a view in cross section taken through the shaft of a machine illustrating a support structure in the shape of a cylindrical ring in which arrays of rod-shaped magnetic segments of exemplary circular shape are circumferentially arranged, with a side portion along the surface of each magnetic segment in contact with a side portion of an adjoining magnetic segment while also secured within an aperture of the support structure.
Figure 9E:
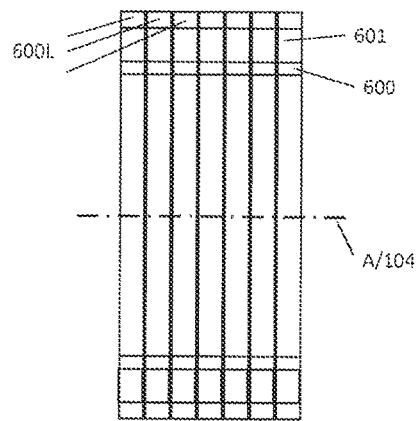
FIG. 9*e* is a partial exterior side view of the support structure along the shaft 104 for embodiments shown in FIGS. 9a-9c, illustrating a sequence of laminated plates 600L forming a support structure 600.
Figure 10:
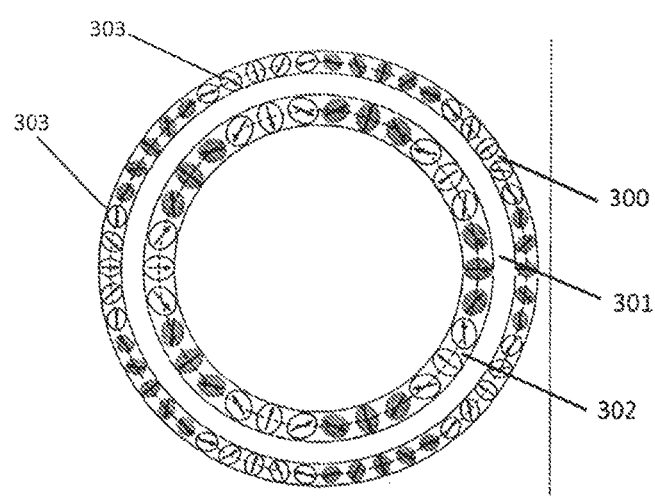
FIG. 10 is a view in cross section taken through the shaft of another electric machine illustrating inner and outer concentric sets of flux-directed magnetic (FDM) arrays each formed in a support structure 600, 602, each array in each set having three or five pole pairs, the support structures 600, 602 each incorporating elliptical apertures into which elliptically-shaped magnetic segments are inserted.
Figure 12:
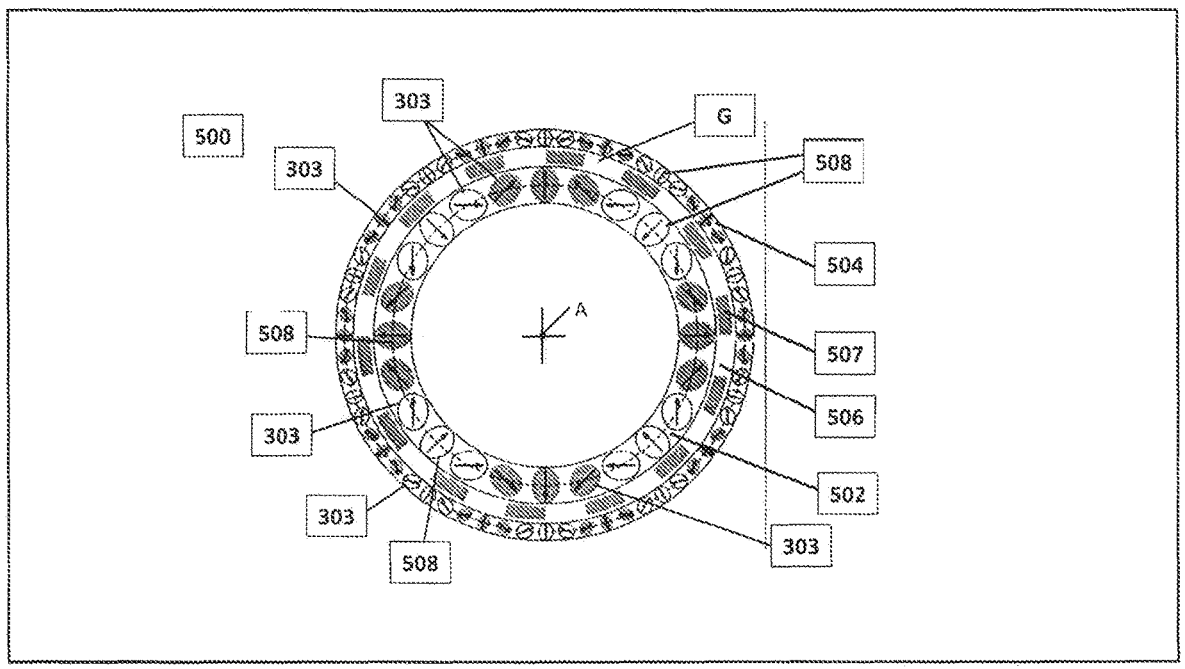
FIG. 12 is a view in cross section, taken along a plane transverse to a cylindrical axis of symmetry, illustrating a magnetic gear system having exemplary arrays of two sets of magnetic poles each assembled with elliptical-shaped magnetic segments and rectangular-shaped ferromagnetic segments in the air gap.

The example embodiments of other flux-directed magnetic ring assemblies, including those shown in FIGS. 9, 10 and 12, are configured in like manner to the afore described configurations of the sets of arrays 107 in the flux-directed magnetic (FDM) ring assemblies 300, 302. That is, the sequential arrangement of segments with rotational shifts in orientations in the maximum field strength direction are incorporated in the other disclosed embodiments, and such arrangements and shifts in orientations will be apparent to persons of ordinary skill such that the same arrangement or similar arrangements need not be described in detail for other illustrated embodiments.

Figures 8B, 8C:
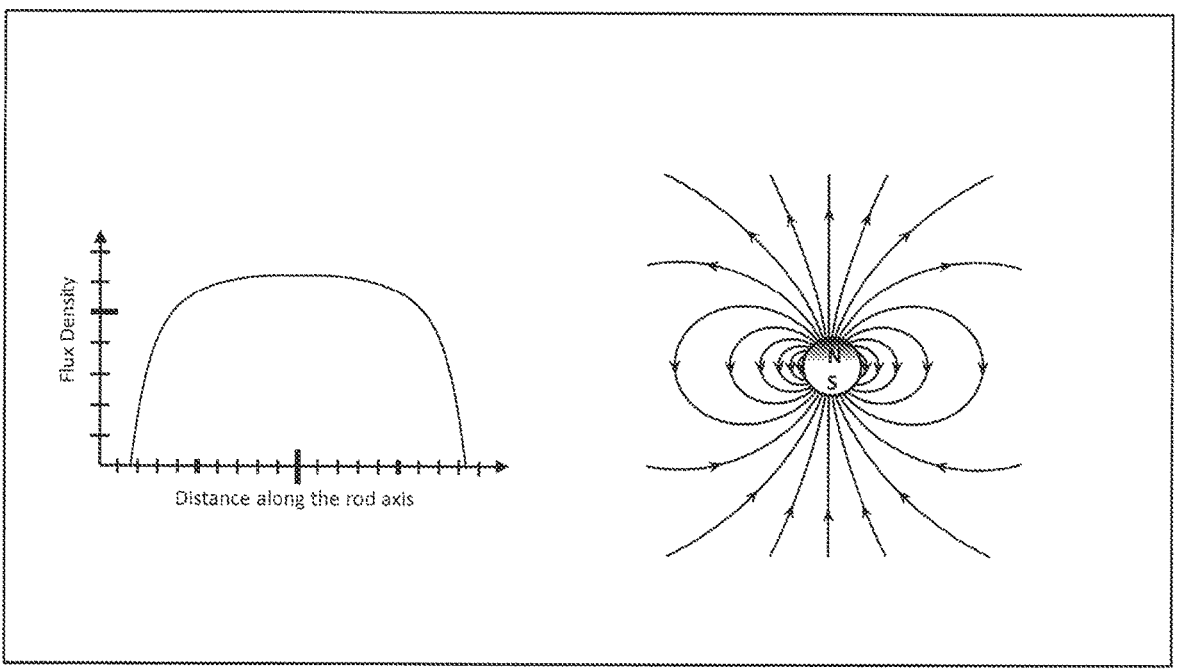
FIG. 8*b* is a view in cross section along the major axis of a discrete magnetic segment, illustrating an exemplary spatial field distribution for one embodiment of a magnetic segment suitable for incorporation into circumferential sequences of flux-directed magnetic arrays shown in FIG. 8*a*.
FIG. 8*c* is an axial view about the discrete magnetic segment referenced in FIGS. 8*a* and 8*b* illustrating the magnetization field strength distribution in radial directions about the segment axis.

With regard to all embodiments for the electric machines disclosed herein, within tolerances suitable for the specific application, it can be advantageous for all magnetic segments within the same FDM ring assembly (e.g., any of the assemblies 300, 302, 505 or 600) to have an identical spatial field distribution, such as shown in the exemplary, qualitative and general illustration of FIG. 8b. Also within tolerances suitable for the specific application, it can be advantageous for all magnetic segments in the same assembly to have identical maximum magnetization field strengths in radial directions about the segment axis 110. The exemplary radial field strength pattern for the dipole field shown in FIG. 8c indicates the maximum field strength directions about the segment axis 110.

When installing each magnetic segment 100 in the entire sequence of arrays in a flux-directed magnetic ring assembly, and prior to rotationally fixing each segment in place to prevent rotation about the segment axis 110, each segment 100 can be rotatably adjusted about the segment axis 110 to a predetermined shift angle position. Segment shift angle positions are determinable relative to the shift angle positions of other segments in the same ring assembly and are also determinable relative to a selected reference angle position, $A_P$, about the shaft axis, A. In FIG. 8 the reference angle position, $A_P$, is an angle defined along a ray, R, which passes through both the axis, A, and the reference angle position, $A_P$. The actual predetermined shift angle position for each segment is, for example, based on the maximum field strength direction established relative to a predetermined angle position for the immediately preceding segment or for the very next segment in the sequence of segments in the ring assembly. The predetermined shift angle position for each segment may also be established relative to the reference angle position, $A_P$, about the central axis, A. The exemplary angular shifts shown in FIGS. 8-10 and 12 results in the flux-channeled arrays 107 collectively exhibiting a rotating sequence of maximum field strength magnetization directions to effect desired flux channeling. Exemplary angular shifts in magnetization directions for individual magnetic segments in the series of multiple arrays 107 are indicated in FIG. 8 with arrows placed within the circles 300. By way of example, outer ring assembly 300 comprises segments each having a 36° rotational shift about its axis 110 relative to the immediately preceding or next segment in the sequence of arrays; and the inner ring assembly 302 comprises segments each having a 60° rotational shift about its axis 110 relative to the immediately preceding or next segment in the sequence of arrays. The shifts in orientations may be based on rotations of the maximum field strength directions of each magnetic segment relative to the immediately prior or next segment in the sequence of segments.

The discrete magnetic segments 100 in the inner ring 302 may be identical to the segments 100 in the outer ring 300 but, in addition to having shape variations in cross section, the segments may vary in overall size for a given rotor shaft length. As an example, for the cylindrically shaped segment 100 shown in FIG. 11, the cylindrical diameter of such a segment may vary between segments in the inner and outer rings or even among segments in the same ring. Performance assessments may be attainable based on modeling in accord with Eqns. 1 and 2.

While the illustrated embodiment of FIG. 8a is suitable for operation as a dual rotor motor or generator, other embodiments may apply the same teachings to single flux-directed magnet assemblies applicable to machinery having a single rotor as shown in FIGS. 4, 5 and 6. For practical applications of electric machines, and magnetic gears incorporating a single assembly comprising multiple arrays of segments 100, or comprising multiple concentric assemblies each comprising multiple arrays of segments: the number of pole pairs, the number of segments per pole, the shapes in cross-section of the individual magnets, the air gap, and the radial thickness of the arrays can each be optimized to maximize the flux density in the gap with flux channeling according to the invention.

Still referring to FIG. 8a, each flux-directed magnet assembly 300 and 302 may comprise coils or a series of permanent magnets, also referred to as pole segments. For embodiments where the segments are permanent magnets, the segments may be spaced-apart from one another, but the surfaces of adjacent pole segments, referred to as major sides, may be adjoining or in contact with one another as illustrated in FIG. 9d.

The view of FIG. 8a is taken along a plane transverse to a cylindrical axis of symmetry common to each assembly of arrays. The segments in the inner assembly 302 project a radially outward-directed flux, and the segments in the outer assembly project a radially inward directed flux, determined by the indicated magnetization directions. Each assembly 300, 302, as well as embodiments of the other assemblies shown in the figures, comprises multiple sets of arrays of discrete magnetic segments 100 to provide a flux-directed magnetic assembly with the appropriate magnetization directions of the individual magnetic rod-like segments to effect desired flux channeling. Summarily, the embodiment of each assembly illustrated in FIG. 8*a* generates a field with 5 pole pairs. Each such assembly 300, 302 of discrete magnetic segments extends along a cylindrical plane within a support structure and along the direction of the axis of symmetry, A. For the inner magnetic array, FDM ring assembly 302, projecting an outward directed radial flux, each pole consists of three segments 100. In the outer magnetic array of FDM ring assembly 300, projecting an inward directed radial flux, each pole consists of five segments 100. The indicated magnetization directions can be obtained by Eqns. 1 and 2 set forth above.

The ideal configuration given by Eqns. 1 and 2 may be best approximated by a large number of segments per pole. However, it can be shown that five segments per pole can provide a suitably close approximation of ideal flux-channeling configurations.

The concentric arrangement of two arrays 300 and 302 of rod-like segments shown in FIG. 8*a* can be used as a rotor for synchronous electrical machines and the underlying concepts may also be applied for operation of magnetic gears. In motor and generator applications, the stator windings will be placed in the air gap between the inner ring assembly 302 and the outer ring assembly 300. The concentric opposing arrays each produce a radially directed flux density as needed for an optimized torque, since the stator current flows in a direction perpendicular to the plane along which the view is taken and the Lorentz force on a conductor in the stator winding is given by the cross-product $F=I\times B$ where I is the current flowing in the conductor and B is the radial magnetic flux.

FIG. 9 illustrate single flux-directed magnetic (EDM) ring assemblies, such as assemblies 300 or 302 of FIG. 8*a* with exemplary azimuthal angles, θ, shown. Each ellipse shape 603 in the assembly schematically represents the orientation of a different magnetic segment 100 in each of a set of multiple arrays 107 forming the circumferential sequence of arrays in one FDM ring assembly 300 or 302. With the magnetic segments being dipole magnets, arrows drawn in each ellipse 603 in the sequence correspond to a configured sequence of shifts orientation of the maximum field strength directions of a pole in each segment about its segment axis 110. In like manner to that described for the ring assemblies 300, 302 of FIG. 8*a*, for each adjoining pair of magnetic segments in either assembly of FIG. 9, associated field patterns are spatially rotated by the same fixed angle, e.g., 60°, in radial directions about the segment axes 110 and, relative to a reference point angle position, $A_P$, about the central axis, A, or shaft 104. By imparting sequential rotations of the fixed angle to the field patterns, the net flux is configured in a manner which provides an augmented magnetic field strength on one side of the sequence of arrays 107 relative to a reduced magnetic field strength on the other side of the same sequence of arrays. With the magnetic segments being clippie magnets, arrows drawn in each in the sequence of ellipses 603 correspond to the configured sequence of shifts in orientation of the maximum field strength directions of each segment about its segment axis 110. FIG. 9 illustrate these shifts in radial directions of the same one of the two poles (i.e., either North or South) of the dipole magnetic segments. The invention is not limited to embodiments which only impart sequential rotations of the same fixed angle to the field patterns. Rather, the net flux may be configured in a manner which provides a beneficial augmented magnetic field strength on one side of the sequence of arrays without all of the field patterns associated with the sequence of segments being spatially rotated by the same fixed angle.

In one embodiment the magnetic segments are in a series of identical and uniformly spaced-apart cylinders which collectively form the cylindrical array pattern of each flux-directed magnet assembly. In this example, with the permanent magnets each having a magnetization direction transverse to the axial direction of the cylindrical shape, the magnets may be individually rotated as a function of position about the assembly to provide the required magnetization direction for a cyclically shifting pattern of magnetization directions along the poles, akin to the pattern in a conventional Halbach array, and for any specified multipole configuration, n.

Figure 11:
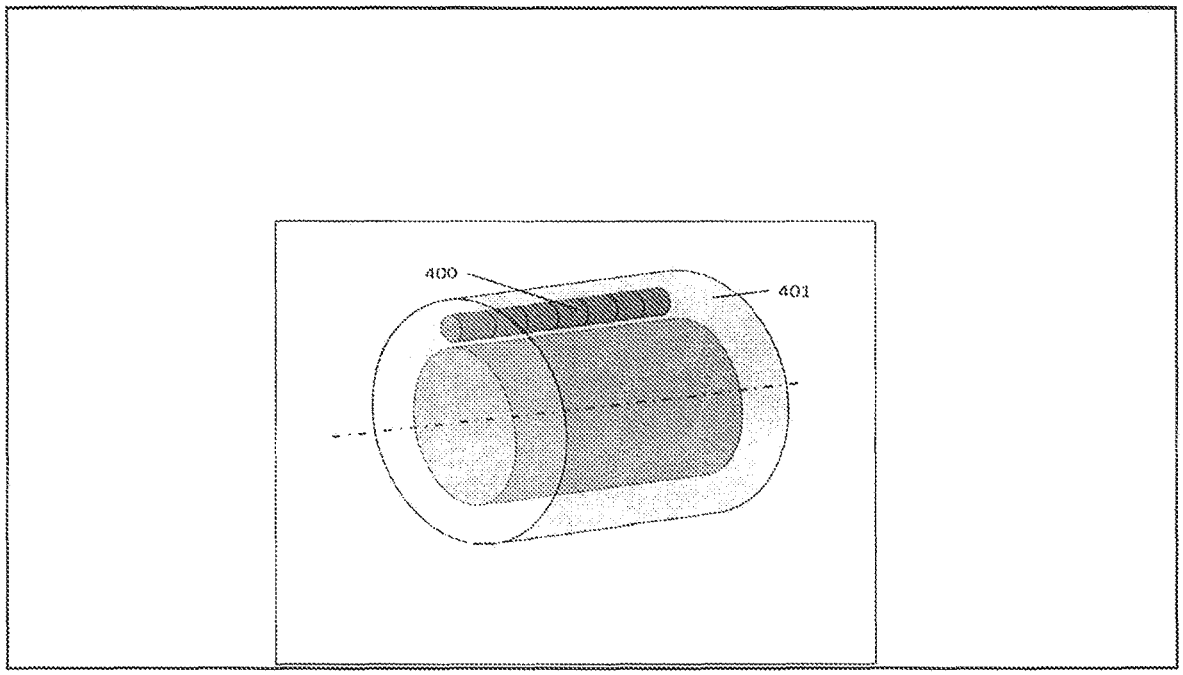
FIG. 11 is a partial perspective view of a cylindrically shaped support ring of the type shown in FIG. 9a, having an exemplary cylindrically shaped magnetic segment inserted within an aperture, the segment comprising multiple sub-segments connected end-to-end.

Referring also to FIGS. 9, 10 and 11, segments in the form of exemplary rod-shaped permanent magnets are each inserted in a series of apertures 601, e.g., slots, or bore holes, to configure a flux-directed magnetic (FDM) ring assembly, e.g., assembly 300 or 302. FIGS. 9*a* and 9*b* each illustrate an exemplary single flux-directed magnetic ring assembly 300, 302. In FIG. 9*a* elliptical-shaped apertures 601 are spaced apart. FIG. 9*b* illustrates circular apertures which are closely packed. The gaps between apertures in FIG. 9*b* are adjustable and can be minimal to almost zero. For other close packed arrangements with other designs for the support structure, sides of magnetic elements can come into contact with one another to maximize packing density. See FIG. 9*d*.

The support structures 600 can be produced with stamped laminations having precision apertures 601 for insertion of the permanent magnet segments therein. Such stacked laminations can be manufactured with accuracies of 0.01 mm or less at relatively low cost. The material of these laminations can be non-magnetic and, for example, can predominantly comprise titanium, to provide a relatively high strength, low density support structure.

During motor excitation, the individual magnets in the illustrated concentric pairs of FDDMS arrays 107 of magnetic segments 100 experience torques that could impart rotation of their positions within the cylindrically shaped support structures in reaction to the Lorentz forces. Such rotations can be prevented, for example, by using magnets with the elliptical shape cross-sections shown in FIGS. 9*a* and 10, with the apertures of the support structures 600, 602 having complementary shapes, e.g., mating elliptical shapes, that lock the magnetic segments in place under the acting Lorentz forces. Alternatively, the rod-like magnetic segments can be chemically bonded, e.g., with an appropriate epoxy, into the support structure to prevent any rotation or axial movement. The surfaces of the major sides 603 of segments, which may be circular-like in cross section may include a key which interlocks along a mating keyway in the support structure.

A feature of the disclosed embodiments is that magnetic segments of the FDDMS arrays are discrete magnets of the type which can be produced with any available permanent magnet material, including NdFeB of the highest available grade (e.g., N52). No further development of permanent magnet manufacturing and magnetization processes is needed to effect volume manufacture. For applications with highest power and torque densities requiring very large flux density $B_R$ (see Eqn 3) in the air gap, superconducting dipole coils can be used as the magnetic segments. In this case all coils of the two rings can be in series or, if preferred, the current in the outer ring can be different from the current in the inner ring.

For designs requiring arrays having significant segment length in the axial direction, as shown for one in a plurality of apertures in the partial view of FIG. 11, multiple discrete subsegments of magnetic segments 100 can be inserted end-to-end within each aperture in each laminated support structure 600, 602. No repulsive forces need to be overcome to place multiple magnets in the same aperture and the magnets inserted end-to-end in the same aperture should not need to be bonded together.

The disclosed discrete arrays of spaced-apart magnetic elements are expected to have significantly higher mechanical robustness over conventional Halbach arrays formed with discrete pie-shaped pieces and are therefore well-suited for machines operating at high RPM. In comparison to FDDMS segment arrays formed with magnetic segments 100, conventional Halbach arrays consist of segments of brittle material glued together and typically overwrapped with fiberglass epoxy.

When compared to a conventional Halbach array, manufacture of the disclosed discrete flux-directed magnet assemblies (e.g., FDM ring arrays) is a more economical process by which magnetic flux is redirected across a small air gap. Notably, all rod-like magnetic segments in the assembly can be identical. If magnetic segments with long axial lengths are assembled of shorter individual magnets, a sorting process can be applied to make sure that all rods within a ring have equal remanent fields. In manufacturing of permanent magnets, variations in remanent field of a few percent from magnet to magnet are typically found. By measuring all magnets and sorting them accordingly, variations in field strengths between rods can be minimized, thereby avoiding torque ripple of the machine.

The foregoing disclosure enables production of more cost-effective discrete Flux-Directed Magnetic (FDM) assemblies of almost any size with highest flux density in the air gap between such assemblies, characterized by a comparatively low weight due to elimination of the back iron. This technology improvement is well suited for magnetic gears (MGs) such as disclosed in U.S. Pat. No. 3,378,710. A summary of applicable embodiments of MGs can be found in "Magnetic Gear Technologies: A Review" by P. M. Tlali, R-J. Wang, and S. Gerber, 2014 International Conference on Electrical Machines (ICEM) (pp. 544-550). IEEE, 2014. Among many embodiments described in the literature, concentric MGs offer high torque transfer with the least mechanical complexity and unique advantages in terms of machine-gear integration options.

Concentric MGs consist of three assemblies having a common axis of revolution, namely an inner ring magnet, an intermediate ring consisting of a plurality of magnetically permeable segments, and an outer ring magnet assembly, One of the assemblies is power-driven which rotates one of the other two assemblies. MGs allow for an increase or decrease in the RPM of an engine and accordingly decreases or increases in applied torque using contact-free magnet interactions instead of mechanical teeth.

FIG. 12 schematically illustrates an embodiment of concentric MGs based on FDM assemblies. The simplified embodiment shown in FIG. 12 schematically illustrates a view in cross section of such a magnetic gear system 500. With the view taken along a plane, P, an inner FDM assembly 502 and an outer FDM assembly 504 are shown concentrically positioned about a central axis, A, transverse to the plane. Each assembly 502, 504 comprises a different plurality of discrete, spaced-apart rod-like magnetic elements 505. The system 500 further includes the aforementioned intermediate assembly 506 comprising a plurality of magnetically permeable segments 507. The FDM assembles 502, 504 and the intermediate assembly 506 are all spaced apart from one another to preclude mechanical contact between the assemblies. The intermediate assembly 506 is positioned in the gap, G, between the two concentrically positioned FDM assemblies 502, 504, i.e., radially outward from the assembly 502 and radially inward from the assembly 504. In each assembly 502, 504, the plurality of discrete, spaced-apart, rod-like magnetic elements 508 extends along a direction parallel to the axis. A, thereby providing magnetic flux in radial directions transverse to the axis, A, for Lorentz force interactions with flux emanating from the magnetic elements in the other FDM assembly, i.e., the 502, 504 provide a pair of concentric cylindrical arrays of parallel magnetic elements 508 wherein elements 508 in different arrays interact, enabling the flux-channeled magnetic assemblies to function as magnetic gear system. A third ring (503), containing a number of ferromagnetic segments (504) is located in the gap between the two flux-channeling magnetic array rings.

A similar embodiment of magnetic gearing comprising two rings of permanent magnets and an intermediate ring having ferromagnetic (i.e., magnetically permeable) segments 507 inserted between the rings of magnets is described in application PCT/US22/30594, filed 23 May 2022 which is incorporated herein by reference. The Implementation of improved FDM assemblies for magnetic gear systems, as described herein with example embodiments, offers an increased torque transfer capability at a reduced weight in comparison to conventional magnetic gears as described in U.S. Pat. No. 3,378,710 to Martin, titled "Magnetic Transmission" and U.S. Pat. No. 11,128,209 to Bird, titled "Magnetic Gearbox with Flux Concentration Halbach Rotors".

Still referring to FIG. 12, the spaced-apart, rod-like magnetic elements 508 in each cylindrical array extend along one of two imaginary concentric cylindrical surfaces as in FIG. 8 and FIG. 10. During rotation of one of the assemblies 502, 504 about the common axis, A, as magnetic elements 508 in different assemblies 502, 504 and ferromagnetic segments 507 positioned in the intermediate assembly 506, approach each other, the rod-like magnetic elements and the segments 507 attract or repel one another, exhibiting behaviors functionally akin to the meshing of teeth on two rotatable gears in a mechanical gear assembly. They are therefore immune to mechanical wear of interacting/mating surfaces, and they create no noise. Advantageously, he gears may also slip without damage to the system 500.

While in mechanical gears only a few teeth are transmitting torque at any moment in time, in the MGs of FIG. 12 all poles are simultaneously involved in torque transfer, resulting in a high volumetric torque transfer density. To achieve highest torque transfer, a large number of poles, as can be achieved with FDM assemblies, is needed. Due to the almost pure harmonics of FDMs torque ripple is extremely low in MGs based on FDM assemblies. For embodiments with high RPM, the permanent magnets, in particular the ones of the high-speed rotor, are subjected to large centrifugal forces. The intrinsic mechanical strength of the FDM assemblies disclosed herein offer automatically high mechanical strength.

The described MGs based on FDM assemblies do not require any back iron which significantly reduces the weight in comparison to conventional north-south magnetic assemblies. The high flux density between the opposing FDM assemblies and the pure harmonics of the assembly will also allow for some systems to eliminate the inner ferromagnetic segment ring, this leading to further reduction in weight and a significant reduction in mechanical complexity.

Figure 13:
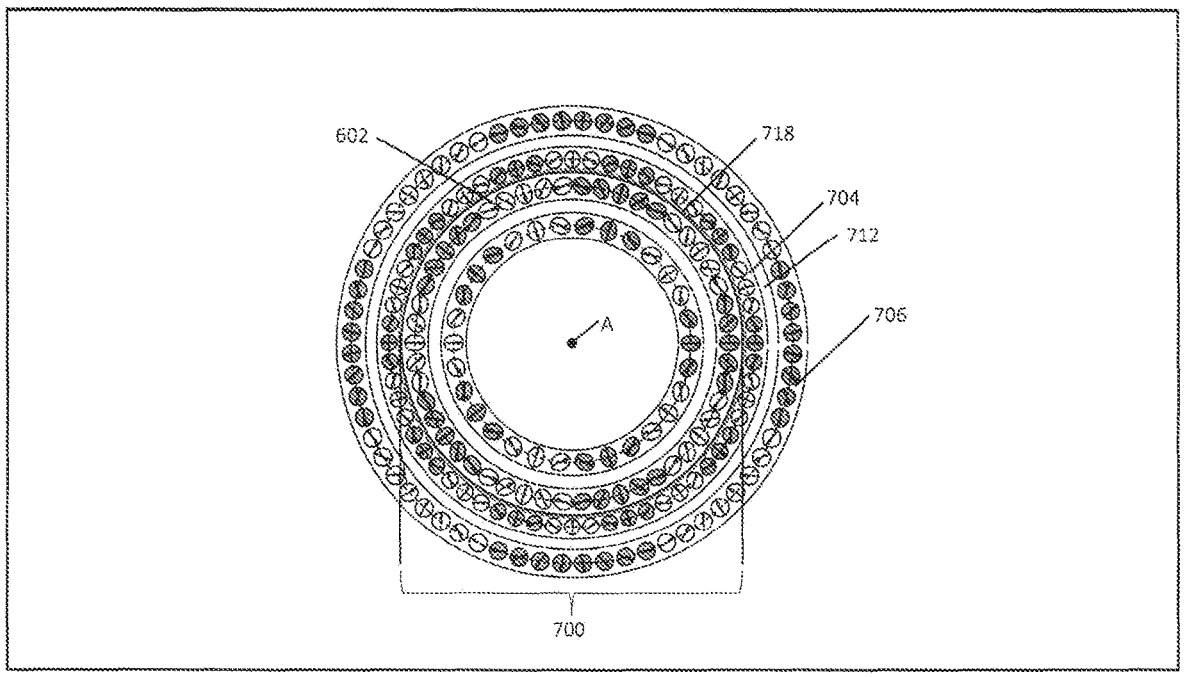
FIG. 13 is a view in cross section, taken along a plane transverse to a cylindrical axis of symmetry, illustrating a magnetic gear system integrated with a dual rotor machine such described with reference to FIGS. 7 and 8.

The aforementioned MGs can be effectively integrated in the disclosed dual-rotor machines of FIGS. 7 and 8. In one such embodiment of another dual-rotor machine 700 of FIG. 13 comprises two additional FDM assemblies 704 and 706, FDM assembly 704, with outside-directed flux, is bonded to the outer ring 602 of the dual rotor system and concentrically rotates with it. The second concentric FDM assembly 706 with a lower, number of poles and inside-directed flux, is added concentric about the same axis A. The two added FDM assemblies 704, 706 are equivalent to the MG 500 shown in FIG. 12. However, to reduce mechanical complexity, it is assumed in the embodiment of FIG. 13 that no intermediate third ring containing ferromagnetic segments in the gap 712 between assemblies 704 and 706, is needed.

Elimination of flux leakage from the dual rotor synchronous machine 700 into the concentric MG FDM assemblies 704, 706 may be effected with addition of a thin, soft iron ring 718 inserted between the outer rotor 602 of the dual rotor machine and the MG FDM assembly 704. Since the adjacent EDM assemblies, i.e., the outer rotor 602 of the synchronous machine and the inner rotor of the MG assembly 704, being FDM assemblies, will already have only small flux leakage, the ring 718 can be very thin. Due to the already small flux leakage and being coupled to the outer rotor 602, iron losses will be very small.

A complete system of synchronous electrical machine with concentric MGS enables such machine to operate at very high RPM which reduces its volume for a given power level, and with the MGs reduces the RPM to a required lower level with accordingly enhanced torque. The resulting assembly of synchronous electrical machine and magnetic gears enables an increase in system power and torque density. The concentric integration of the gears in contrast to conventional embodiments in which the gears are attached in axial direction leads to a significant reduction in the total system volume.

Many other embodiments of synchronous electrical machines as described can be augmented with concentric MGs in ways apparent to those skilled in the art. In all such embodiments, the integrated MGs will significantly enhance the performance of synchronous electrical machines with respect to power and torque density.

For example, in the case of a wind power generator with a required low RPM, i.e less than 20 RPM, the wind-driven propeller can be coupled to MGs which with the appropriate gear ratio drive the generators at a much higher RPM. Since the power of an electrical machine is proportional to the RPM, the size of the generator can be reduced accordingly, and the increased output frequency of the generator facilitates the required current rectification. Since mechanical gear boxes in wind generators have been found to constitute the element with the shortest meantime between failure of the whole system, MGs with their intrinsic slippage capability, will significantly improve reliability.

For aircraft propulsion, on the other hand, a synchronous electrical machine operating at very high RPM, e.g., 30,000, can be considered with the corresponding reduction in size for a given power level. With integrated MG assemblies, the RPM can be reduced to a level that is adequate for a propeller.

The high power density of the described synchronous electrical machines measured in kW/kg or their high volumetric power density measured in kW/liter are also well suited for an implementation of such systems in the hub of wheels for many vehicles like trucks, passenger cars, golf carts, wheel chairs, etc. Due to the comparatively low weight of the disclosed system in comparison to conventional electrical machines, the moment of inertia of wheels with integrated drives in their hubs is significantly reduced, leading to a faster response and increased acceleration capability.

FEATURES AND ADVANTAGES OF THE INVENTION

The invention enables use of flux channeling without the constraints which have limited applications of the technology. In one embodiment an array for use in a rotating machine contains a plurality of like discrete magnetic segments. When the segments are spaced apart, such as prior to placement in the array, each includes a pole having the same maximum field strength. Flux channeling can be effected when the segments are (i) formed in a circumferential array with rotated fields in a sequence along the array, and (ii) with each segment positioned in sufficient proximity to the next segment in the sequence along the array for the fields to interact with one another. Among different embodiments of the invention, for flux channeling to occur the segments may be in physical contact with one another or they may be spaced-apart but in such sufficiently close proximity that the fields between segments next to one another in the array interact to effect flux channeling.

While the invention has been described with reference to particular embodiments, it will be understood by those skilled in the art that various changes may be made, and equivalents may be substituted for elements thereof without departing from the scope of the invention which is only limited by the claims which follow.

The invention claimed is:

1. A magnetic system suitable for use in a rotating machine or a gear box, comprising at least a first array structure containing at least a first plurality of like discrete magnetic segments and extending along a central axis, with each segment in the first plurality:
   (i) having an elongate length, relative to its width, extending along a major side thereof in a direction parallel with the central axis,
   (ii) including a pole with a like characteristic field distribution including a maximum field strength direction and the same maximum field strength,
   (iii) having a surface, with a predefined shape in cross section, from which the maximum field strength direction points outward therefrom, about which surface the segment is axially rotatable prior to fixed placement of the segment in the first array of like magnetic segments circumferentially positioned about the central axis,
   (iv) fixedly arranged with its major side extending in a direction parallel to directions along which the major sides of other segments in the first plurality extend, and
   (v) positioned to extend in a direction parallel with the central axis to collectively form, in combination with others in the first plurality, the first array of like magnetic segments, which first array is configured as a first ordered sequence having field poles of the magnetic segments rotated with respect to one another as a function of position in the first sequence, this resulting in shifts in angular orientations of the field poles among the magnetic segments in the first sequence.

2. The system of claim 1 wherein segments in the first plurality are positioned in contact with, or in sufficient proximity to, one or more other segments to additively combine or reduce fields from different segments and thereby impart net field strengths about the first array structure wherein an augmented magnetic field strength results on one of the inner side or the outer side of the array relative to a reduced magnetic field strength on the other of the inner side or the outer side of the array.

3. The magnetic system of claim 1 wherein the magnetic segments are in an ordered sequence wherein the magnetic segments are axially rotated with respect to other magnetic segments to sequentially shift orientations of the characteristic maximum field strength direction among the segments and thereby effect the augmented magnetic field strength on one side of the array.

4. The magnetic system of claim 1 further including a support structure with which:
the magnetic segments of the first plurality occupy fixed positions relative to the central axis and relative to one another, and
the relative shifts in orientations of the characteristic maximum field strength directions among the field poles is fixed.

5. The magnetic system of claim 4 wherein the support structure includes a series of channels or grooves in which the magnetic segments are placed.

6. The magnetic system of claim 5 wherein the magnetic segments and the channels or grooves have complementary shapes or mating features which lock the rotational positions of segments in place to fix the relative shifts in field orientation in place.

7. The magnetic system of claim 1 further including a support structure having a series of apertures therein and formed along the central axis, with discrete magnetic segments in the first plurality axially rotated and positioned within the apertures to sequentially provide the shifts along the array.

8. The magnetic system of claim 7 wherein the support structure comprises a series of stamped laminations joined against one another wherein the laminations comprise nonmagnetic material.

9. The magnetic system of claim 1 further including a second array structure comprising at least a second plurality of like discrete magnetic segments, and extending along the central axis, with each segment in the second plurality:

(i) having an elongate length, relative to its width, extending along a major side thereof in a direction parallel with the central axis, (ii) including a pole with a like characteristic field distribution including a maximum field strength direction and the same maximum field strength, (iii) having a surface, with a predefined shape in cross section, from which the maximum field strength direction points outward therefrom, about which surface the segment is axially rotatable prior to fixed placement of the segment in the second array of like magnetic segments circumferentially positioned about the central axis, (iv) fixedly arranged with its major side extending in a direction parallel to directions which the major sides of other segments in the first plurality extend, and (v) positioned to extend in a direction parallel with the central axis to collectively form, in combination with others in the second plurality, the second array of like magnetic segments, which second array is configured as a second ordered sequence having field poles of the magnetic segments rotated with respect to one another as a function of position in the second sequence, this resulting in shifts in angular orientations of the field poles among magnetic segments in the second sequence.

10. The machine of claim 9 wherein the second array of magnetic segments is configured to provide a sequence of elements comprising rotationally shifting angular orientations of magnetic field patterns where the angular orientation of field patterns rotates among different magnetic elements in directions orthogonal to the central axis.

11. The system of claim 9 where the second array includes m magnetic segments and the field pattern among every one of the m segments is characterized by a rotational shift in the angular orientation relative to the angular orientation of the field pattern of the next element in the sequence.

12. The machine of claim 1 where the spatial rotation of the field patterns configures the flux in a manner which provides an augmented magnetic field strength on one of the inner side or the outer side of the first array relative to providing a reduced magnetic field strength on the other of the inner side or the outer side of the first array.

13. The machine of claim 1 where the first array includes n magnetic segments and the field pattern among every one of the n segments is characterized by a rotational shift in the angular orientation relative to the angular orientation of the field pattern of the next element in the sequence.

14. The system of claim 1 where the first array includes n magnetic segments and the field pattern among fewer than every one of the n segments is characterized by a rotational shift in the angular orientation relative to the angular orientation of the field pattern of the next element in the sequence.

15. The system of claim 1 wherein the flux directing inner back iron is mechanically coupled to rotate with the rotor in synchrony to avoid, reduce or eliminate the presence of a changing field which would cause magnetization to occur in the back iron.

16. The system of claim 1 further including a circumferential array comprising ferromagnetic segments positioned between the first array and the second array in coaxial alignment with each.

17. The magnetic array according to claim 1 positioned in a system comprising a synchronous electrical machine or a magnetic gear box, comprising:
a frame positioned along the central axis;
a shaft connected for rotation with respect to the frame and extending in a first direction through the central axis;
a field-generating rotor and a stator each concentrically positioned about the shaft to each be coaxial with respect to the other about the central axis and extending in a direction along the frame, with the stator fixedly attached to the frame and the rotor attached to the frame for rotation relative to the frame and the stator,
the rotor and the stator each having a circumferential surface extending along the central axis, one of the rotor and the stator comprising the first array structure positioned therein, wherein each segment in the first plurality is positioned in sufficient proximity to the next segment in the sequence to enable the fields to interact with one another and effect flux channeling.

18. The system of claim 17 wherein each segment in the first plurality is positioned in sufficient proximity to the next segment in the sequence to enable the fields to interact with one another and effect sufficient flux channeling to render unnecessary bending of magnetic field lines by placing back iron as shielding about the frame to provide a return path for magnetic flux of the field generating rotor.

19. The system of claim 17, with the rotor comprising the first array structure and the stator comprising a winding, the system further including back iron, positioned radially outward from the magnetic segments in the first array structure of the rotor and coaxial with the rotor, with the winding of the stator extending along an air gap between the rotor and the back iron, to generate an enhanced radial flux density in the air gap.

20. A magnetic array for use in a synchronous electrical machine or a magnetic gear box, comprising a plurality of discrete magnetic segments wherein:

when individual ones of the segments are spaced away from influence of ferromagnetic material, such as prior to placement in the array, each includes a pole having the same maximum field strength, each segment is positioned in a sequence along a circumferential array with changes in field orientation by which the field of each segment is spatially rotated relative to the field of a next segment in the sequence, and each segment is positioned in sufficient proximity to the next segment in the sequence to enable the fields to interact with one another and effect flux channeling, wherein each segment may be in physical contact with, or spaced apart from, a next segment in the sequence for interaction of the fields between segments next to one another in the array to effect the flux channeling.

21. The invention of claim 20 wherein each segment in the magnetic array is spaced apart from, but in sufficient proximity to, a next segment in the sequence that the fields between spaced- apart segments next to one another in the array interact to effect flux channeling.

* * * * *